US007646498B2

(12) United States Patent
Chiu

(10) Patent No.: US 7,646,498 B2
(45) Date of Patent: Jan. 12, 2010

(54) THERMAL PRINTER READ AFTER PRINT CORRELATION APPARATUS

(75) Inventor: Lihu Chiu, Arcadia, CA (US)

(73) Assignee: Printronix, Inc., Irvine, CA (US)

( * ) Notice: Subject to any disclaimer, the term of this patent is extended or adjusted under 35 U.S.C. 154(b) by 941 days.

(21) Appl. No.: 10/850,604

(22) Filed: May 20, 2004

(65) Prior Publication Data

US 2005/0002049 A1 Jan. 6, 2005

Related U.S. Application Data

(62) Division of application No. 10/218,834, filed on Aug. 14, 2002, now Pat. No. 6,896,428.

(51) Int. Cl.
*G06K 15/00* (2006.01)

(52) U.S. Cl. ........................ 358/1.14; 358/1.1; 358/1.8; 358/1.12; 400/120.1; 400/103

(58) Field of Classification Search .................. 358/1.1, 358/1.14, 1.12, 1.8; 347/171-245, 129-140; 400/120.01-120.18, 124.01-124.32
See application file for complete search history.

(56) References Cited

U.S. PATENT DOCUMENTS 4,587,411 A * 5/1986 Obstfelder et al. .......... 235/437
4,699,531 A * 10/1987 Ulinski et al. ................. 400/74
4,795,281 A 1/1989 Ulinski et al.
5,267,800 A 12/1993 Petteruti et al.
5,564,841 A 10/1996 Austin et al.
5,708,462 A 1/1998 Helmbold et al.
5,803,624 A 9/1998 Miazga et al.
6,028,674 A 2/2000 Tognazzini
6,042,279 A * 3/2000 Ackley ....................... 400/103
6,292,218 B1 * 9/2001 Parulski et al. ........... 348/220.1
6,340,255 B1 1/2002 Konishi et al.

(Continued)

FOREIGN PATENT DOCUMENTS

EP 0932111 7/1999

(Continued)

OTHER PUBLICATIONS

Helmut Kipphan, handbook of Print Media, 2001, p. 40, p. 310, p. 1115.*

(Continued)

*Primary Examiner*—King Y. Poon
*Assistant Examiner*—Iriana Cruz
(74) *Attorney, Agent, or Firm*—Haynes and Boone, LLP.

(57) ABSTRACT

A printer and a process for correlating printed subject matter with subject matter that is meant to be printed by a printer with a printing mechanism or print engine such as a thermal printer including a print head, a platen, a media upon which labels are printed and a printer controller for imparting print data to the print head. An imager sends printed data as imaged to a read after print (RAP) controller for comparing the data received from the imager to data imparted to the print head or other printing mechanism. A tap, taps the data imparted from the print head and correlates it with the imaged data to determine the media speed, the image alignment, label analysis, weighing of blemishes, the gaps printed on a label, and other criteria.

11 Claims, 20 Drawing Sheets

U.S. PATENT DOCUMENTS

| | | | |
|---|---|---|---|
| 6,354,503 | B1 | 3/2002 | Chiu |
| 6,357,942 | B1 | 3/2002 | Adkins et al. |
| 6,493,110 | B1 | 12/2002 | Roberts |
| 6,498,616 | B1 | 12/2002 | Nagumo et al. |
| 6,666,593 | B2 | 12/2003 | Akaiwa |
| 6,710,895 | B1 * | 3/2004 | Gatto et al. .................. 358/1.6 |
| 2002/0176730 | A1 | 11/2002 | Bleckmann et al. |

FOREIGN PATENT DOCUMENTS

| | | |
|---|---|---|
| EP | 1085452 | 3/2001 |
| FR | 2754371 | 10/1996 |
| JP | 63007955 | 1/1988 |
| WO | WO 9303454 | 2/1993 |

OTHER PUBLICATIONS

EP 03254353 Search Report, Jul. 14, 2004, Printronix.

Shimizu T et al: "Read/Write LED Print Head" Apr. 1, 1997, pp. 15-18, vol. 63, No. 158, OKI Electric Industry, Tokyo, JP.

* cited by examiner

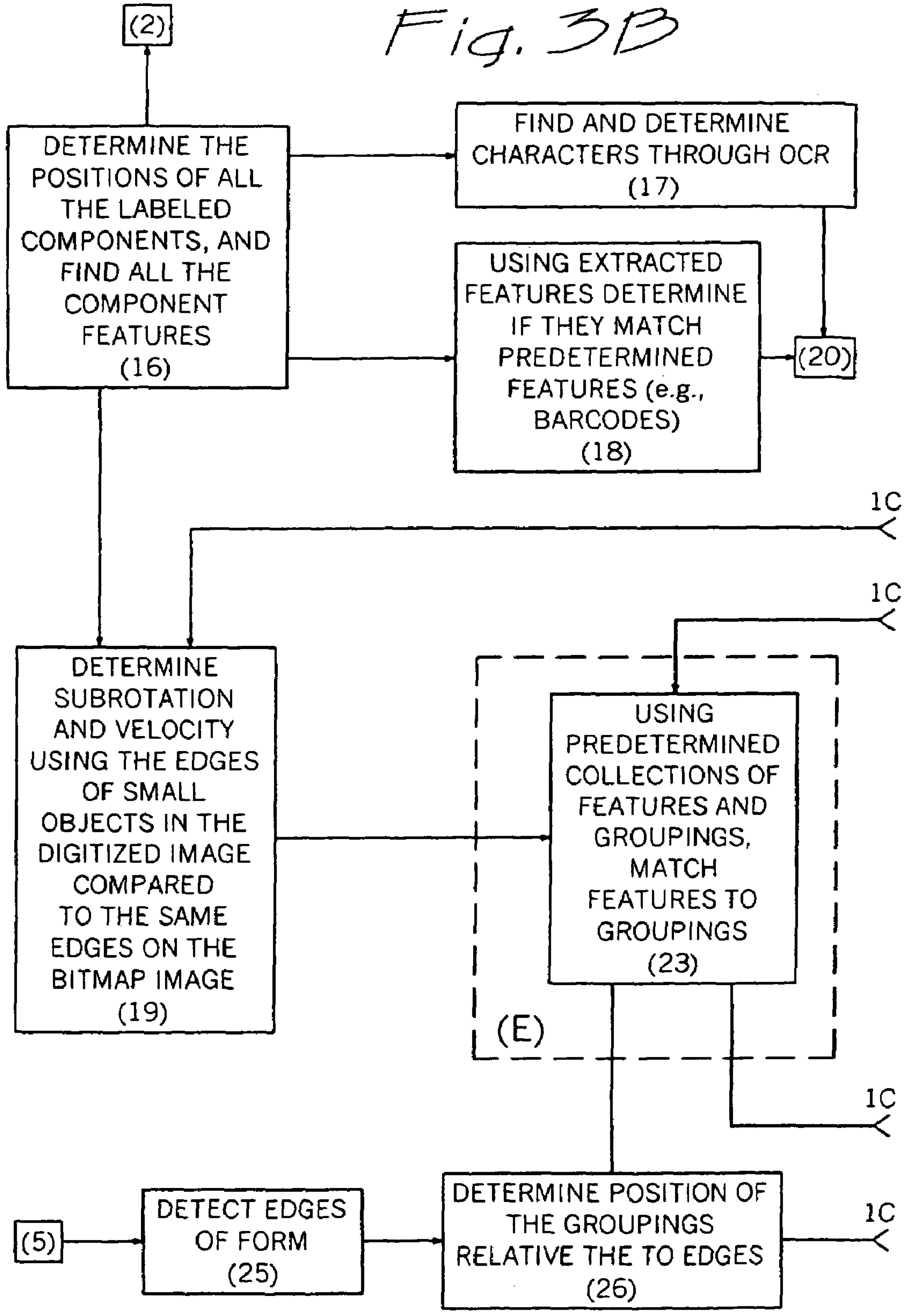
Fig. 3B
(2)
DETERMINE THE POSITIONS OF ALL THE LABELED COMPONENTS, AND FIND ALL THE COMPONENT FEATURES (16)
FIND AND DETERMINE CHARACTERS THROUGH OCR (17)
USING EXTRACTED FEATURES DETERMINE IF THEY MATCH PREDETERMINED FEATURES (e.g., BARCODES) (18)
(20)
1C
1C
DETERMINE SUBROTATION AND VELOCITY USING THE EDGES OF SMALL OBJECTS IN THE DIGITIZED IMAGE COMPARED TO THE SAME EDGES ON THE BITMAP IMAGE (19)
USING PREDETERMINED COLLECTIONS OF FEATURES AND GROUPINGS, MATCH FEATURES TO GROUPINGS (23)
(E)
1C
(5)
DETECT EDGES OF FORM (25)
DETERMINE POSITION OF THE GROUPINGS RELATIVE THE TO EDGES (26)
1C

THERMAL PRINTER READ AFTER PRINT CORRELATION APPARATUS

CROSS REFERENCE TO RELATED APPLICATIONS

This is a divisional application of U.S. patent application Ser. No. 10/218,834, entitled "Printer Read After Print Correlation Method and Apparatus", filed Aug. 14, 2002 now U.S. Pat. No. 6,896,428.

BACKGROUND OF THE INVENTION

1. Field of the Invention

This invention is in the field of printers. The printers specifically can be dot matrix line printers, thermal printers, or laser printers. It more specifically deals with reviewing the printed subject matter for purposes of accuracy. The review of the printed subject matter for purposes of accuracy is performed by a read after printing process that is correlated with the information that was utilized for the printing process. The particular correlation evolves into multiple steps and correlations provided with real time analysis for determining the accuracy of the printed subject matter. Within this field, this invention is different from prior concepts with regard to such inventions as printer verifiers known in the art.

2. Background of the Invention and Prior Art

The background of this invention within the prior art resides in verifying the accuracy of various printed materials. These printed materials can be labels, such as bar code labels, alpha numeric symbols or, specific printed subject matter in a particular language.

In the prior art, it has been customary to verify printed subject matter for purposes of accuracy to avoid improper readouts and descriptions. For instance, if inaccuracies exist in bar codes, it can seriously effect the readout of such bar codes in commercial transactions including retailing. Also, if improper labels are utilized not only with regard to bar codes but written subject matter, such inaccuracies can In particular, it has been recently accepted to use bar codes and other label types for robotic handling of various processes. In some cases, the robotic handling of various processes is dependent upon a particular bar code or other printed subject matter in order to provide a correct readout for a subsequent process. Such readouts are necessary in order to automate certain systems in various commercial and industrial fields.

Recently, it has been customary to utilize multiple labels that are variably sequentially printed. Such multiple variable labels can be carried as media on an underlying substrate. The underlying substrate can carry multiple labels which can sometimes exceed twenty five different labels in number within a particular printing process until the re-printing of the labels again takes place. Such labels can be emplaced on a carrier or liner in different sizes, shapes, and configurations with various bar codes and subject matter printed thereon.

After the printing of such multiple labels, the respective labels can then be extracted or removed from the carrier or liner by a robotic system in order to emplace them on subject matter, materials, or an object which is later subject to robotic handling. This can also include machine intelligent processes that subsequently read the labels. Thus, the accuracy of a particular label or plural labels within a multiple series of label groupings is most important. This is necessary not only from the standpoint of the individual respective label, but also that it not be confused with other labels in the same printing process as they are printed on a parallel or sequential basis.

This invention is of particular importance in order to effect the accuracy and reading of such labels. For instance, the invention can keep track of multiple forms all in compliance and to the same standard. It can determine thereafter if one label is printed badly or a number of labels would have to be re-printed. Thus, label formats are provided to particular stations in the sequence and accuracy in which they are required.

The read after print concepts of this invention maintain compliance to certain standards so that machine automation can be enhanced. Such machine automation relies upon proper orientation of the labels as to any offset or skewed orientation in the X Y relationship or any angle inherent within the nature of the printing of the labels.

Another feature of this invention is that if the label is improperly oriented on the carrier or liner the invention will check to see whether or not the printing encroaches upon a pre-printed portion of the label or other portions including the carrier. It also checks upon the general quality control of the media and the print ribbon material that is displaced such as the heated wax on the print ribbon in a thermal printer.

Another feature of this invention is to check on the density of the printed material or bar code, and to determine whether or not it is properly transferred as well as to check on the sharpness of the appearance.

Another feature is to check on the edge orientations of the printed material and the readability as well as providing the ability to avoid misinterpretation of data in a subsequent process.

As previously stated with regard to the orientation, the invention calculates the print position of the label and determines the position of the grouping of the printed subject matter.

Finally, another feature is that the invention determines whether or not the underlying carrier or liner has been printed upon or whether it has been overlapped.

All of the foregoing features of this invention by the method and the apparatus are deemed to be different from the prior art as to both the broad nature and the multiple distinctions thereof.

SUMMARY OF THE INVENTION

In summation, this invention provides for a read after print correlation and control for printed subject matter that has been printed by a thermal printer, impact printer, or laser printer by a specific controller that is interfaced with an image sensing module to provide the image that has been printed and a tapping off of the information from the print head that has been received from the printer controller to correlate the respective information received at the print head with that which is sensed from the actual printed subject matter.

More specifically the invention incorporates the concept of providing such evincing and sensing thereof by means of multiple photo sensors that obtain a particularly reflective output from an illumination source such as LED's. The photo sensors are interfaced with a lens so that light reflected from the LED's can be sensed and provided as an output that can be obtained and evaluated against a given standard.

The reading provided by the image sensing module is provided to the read after print controller. The read after print controller also receives the information that has been provided to the print head. This is from the printer controller. Thus, information that has been provided to the print head can be given to the read after printer controller and correlated with the image that has been sensed by the image sensing module. The correlation is then determined as to accuracy between the actual image sensed and the print data or instructions that were provided to the print head.

The controller can function in such a manner as to read the print head information and the image information. It also reads the carrier or paper velocity or the underlying media velocity as well as synchronizing the image capture with the related velocity.

The controller also functions to rotate and translate the image to the bit map and interpolate image gaps.

The read after print controller serves to compare printed pixels to commanded pixels to the print head. It also serves to perform label analysis to determine criticality of blemishes or the character and readability of the labels both singularly and in series. It provides this analysis to determine through a weighing system the quality of a particular label. It then enables this quality to be provided as a resultant output so that the label can be qualified as to acceptable use for a later process.

DESCRIPTION OF THE PREFERRED EMBODIMENTS

Figure 1:
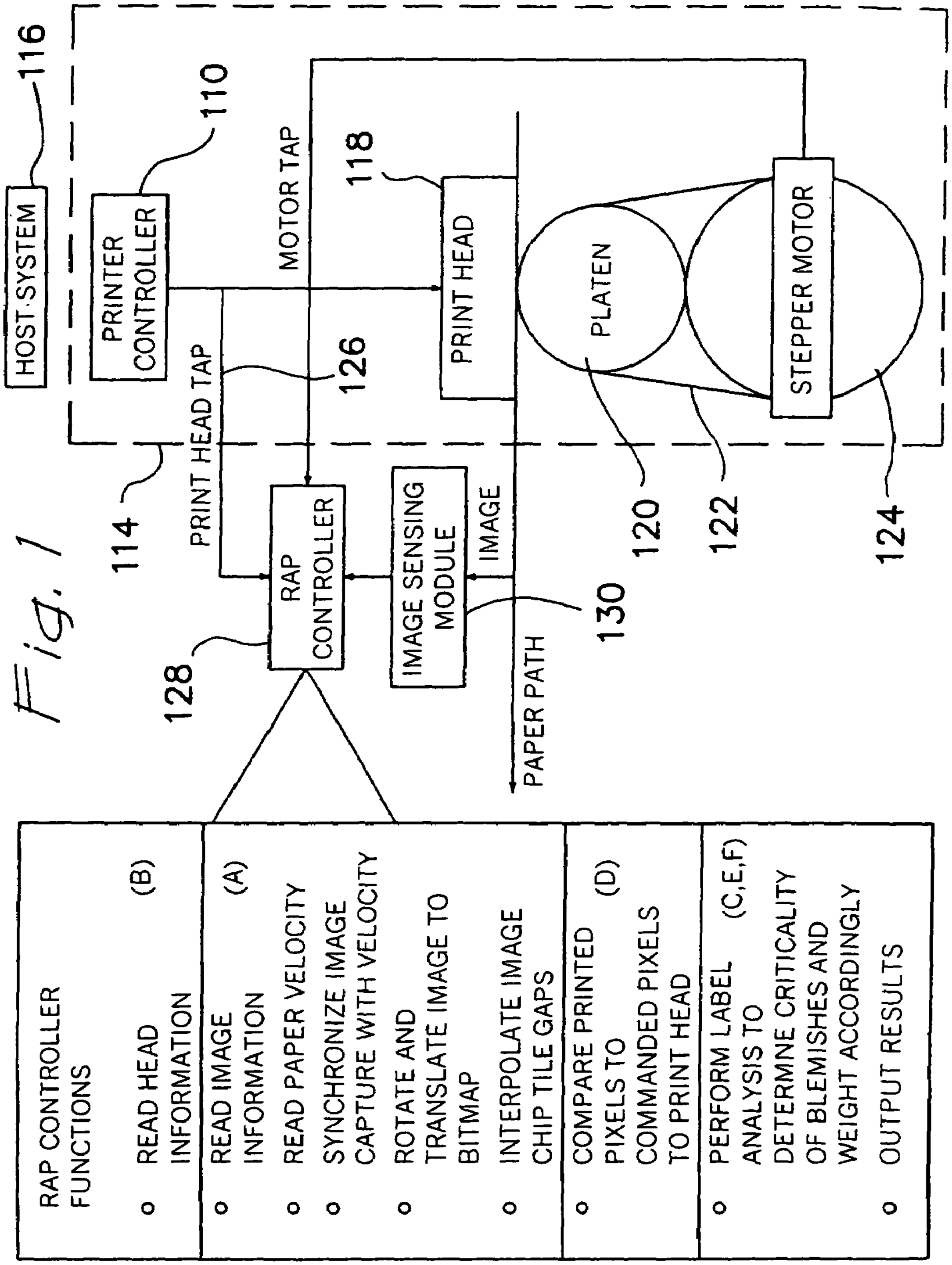
FIG. 1 is a block diagram showing the invention and the specifics related to the various functions.

FIG. 1 shows the overall system and process for reading the printed subject matter and comparing it with the proper data to be printed. The printer is usually such where it has an internal printer controller 110. The printer controller 110 is within a printer 114 as seen on a schematic basis within the block labeled as such. The printer 114 can be any printing mechanism or any particular printer engine which is compatible with the processes and methods to provide the read after print correlation of this invention.

The printer 114 can be controlled by the printer controller and receive signals from a host or host system 116 providing data or other information for controlling the printer 114 through the printer controller 110. This host 116 can be part of a system that has been placed in series or in parallel with other printers.

The printer 114 in this particular case is shown as a thermal printer. However, the printer can be a laser printer, line printer, or various impact printers driven by its respective printer engine. The thermal printer 114 has a print head 118 which has a number of heated dot or pixel areas. The heated dots dispose a waxy substance on a print ribbon in order to place the respective dots on the media which is passing thereunder.

Underlying the print head 118 is a platen 120 that rotates by means of a drive means such as a belt 122 or other linkage driven by a stepper motor 124. One of the controlling factors to the printing system is to provide the media moving between the print head 118 and the platen 120 as the stepper motor turns. The movement of the stepper motor is key to allowing for a sufficient time related to the heating of the respective dots by the print head 118 which this invention serves to control as well as a multitude of other functions.

In order to provide for the invention through the read after print (RAP) or RAP controller 128, a print head tap 126 receives data from the printer controller 110 in the nature of the printed subject matter. This print head tap 126 provides the data to the read after print (RAP) or RAP controller 128.

An image sensing module, or imager 130 provides information to the read after print (RAP) controller 128 as to the respective placement and quality of the image seen from the printed subject matter after it is printed by the print head 118.

The description shown as to the paper path in a thermal printer is actually the path of the carrier or liner with the media such as plastic labels which are to be printed thereon. This printable media with the liner or carrier can be transferred to another process. The labels can then be stripped for providing them to another area utilizing them in a particular process or stripped from the carrier or liner for later use, or stored.

Figure 2:
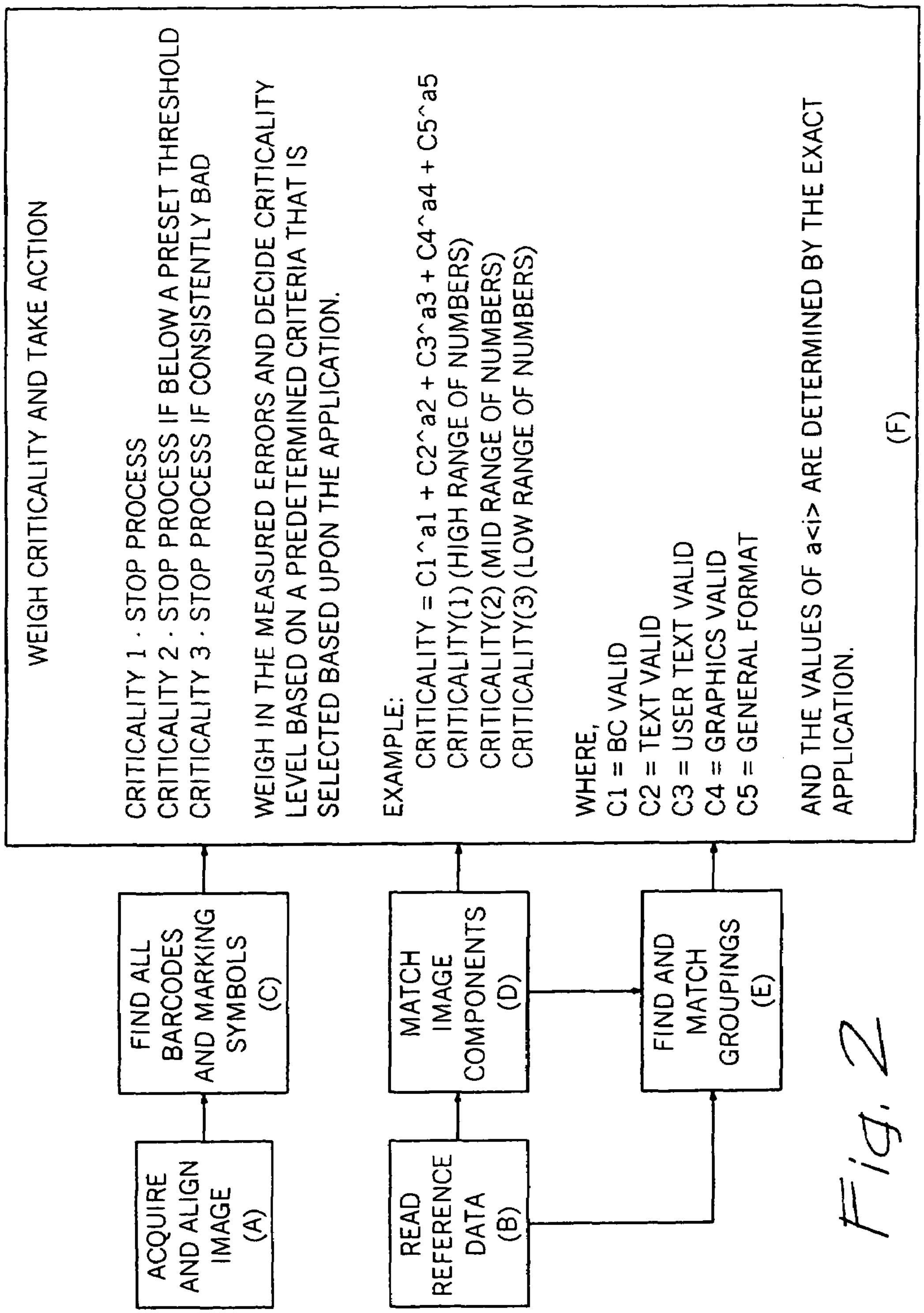
FIG. 2 is a block diagram showing the major steps for determining the accuracy and characteristics of the printed subject matter and the action as taken with respect to criticality.

The showing of FIG. 1 shows that the read after print (RAP) controller 128 functions or performs processes in a manner as detailed further in FIG. 2. This provides the functions or processes of read head information (B). The RAP controller 128 also provides collectively read image information, read paper velocity, synchronizing of image capture with velocity, rotating and translating the image to the bit map, and interpolating the image chip tile gaps all labeled in box (A).

The RAP controller 128 with its processor compares printed pixels to those commanded pixels to the print head (D). The RAP controller 128 also performs label analysis to determine the criticality of blemishes and weigh them against a pre-established standard to provide appropriate output results shown in the box labeled (C, E, and F).

Such functions or processes as shown in portion (A) of the RAP controller 128 can determine when the print head 118 is not properly aligned. It can also determine gaps in the printed material and accurately fund the edges of the respective gaps to determine the accuracy of print position.

The functions or processes of (C, E, and F) can provide a permanent output. Processes of (C, E, and F) can also weigh the aspects thereof or indicate them to a downstream process which uses the data or image such as in a bar code that has been printed.

Looking more particularly at FIG. 2, it can be seen that the functions or processes of (A), (B), (C), (D), and (E) on the higher level provide for the foregoing functions. This higher level function or process allows the function for instance of acquiring and aligning the image (A). In this manner, the image is rotated as well as aligned in order to determine whether it is properly placed on the labels.

Function or process (B) is such where the reference data is read. Once the reference data is read, it passes the reading to function or process (D) to match the image component and find the matched grouping in process (E).

The acquisition and alignment function or process (A) after the data is rotated and aligned, passes the information for the bar codes and marking symbols for purposes of determining all bar codes.

The foregoing information or data is then weighed with regard to criticality for action thereafter. The weight of the criticality is dependent upon the net result that is desired as far as the quality is concerned of the printed subject matter. This quality factor can be specified by a customer or the end usages for which the printed subject matter is to be used.

For instance, in some processes or functions, the reading of a bar code or other printed subject matter can be easily undertaken at levels demanding less criticality and quality of printed subject matter. In other cases, it is necessary to have a higher degree of criticality as to quality of the printed subject matter. Thus, the criticality can be established as to the weightings determined by "a" as seen in the weighing example of FIG. 2. This criticality can be established through look-up tables in the printer controller 110 or within the host system 116. It can also be modified depending upon the requirements for end use of the subject matter.

For instance, in the example where the weighing of the criticality and taking the action is shown, the measured errors and criticality level are based upon a predetermined criteria that is selected based upon the application or end usage of the label such as a bar code.

When viewing the weighing of criticality and the taking of action in FIG. 2, it can be seen that if the substantial range of numbers when added together exceeds a number to the point where the bar code or printing could not be read, the process is stopped. If the bar code or printing could be read but is not good, the process is stopped if it is below a pre-established threshold. Finally, if the bar code is detectable but consistently bad, the process would be stopped.

The way the criteria and resultant data is weighed is through the established criticality absolute values, for example C1 through C5 as seen in FIG. 2. These values C1 through C5 depending upon an end use are then weighed through relative weights a1 through a5. Fundamentally, the absolute values C1 through C5 are multiplied by the weightings which could possibly be a certain percentage based upon end use, or customer requests for the downstream process. This provides for the criticality shown in criticality examples 1, 2, and 3. A high range of numbers stops the process, a mid range of numbers would possibly allow a continuation if read, and a low range of numbers if detectable but consistently bad would also stop the process.

The input to the criticality example is such wherein: the bar code BC is readable C1, the text valid is readable but not as clearly as desired C2, the user text is valid and corresponds to the pixel images C3, the graphics are valid which might be in the form of a particular graphic representation C4, and the general format is valid as to placement and other characterizations C5.

Figure 6:
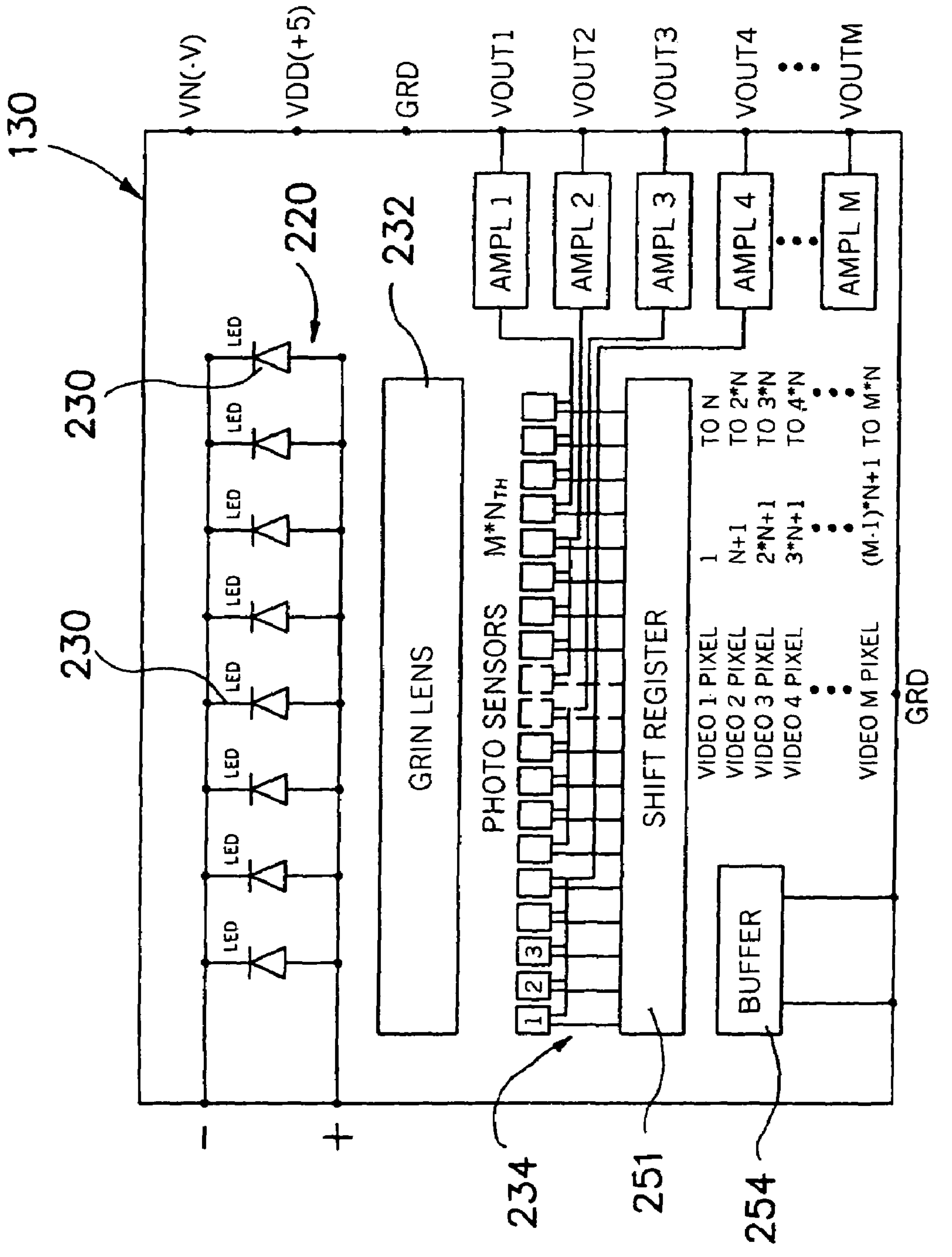
FIG. 6 shows a schematic diagram of the light source lens and photo sensors for reading the subject matter of the printed material.
Figure 7:
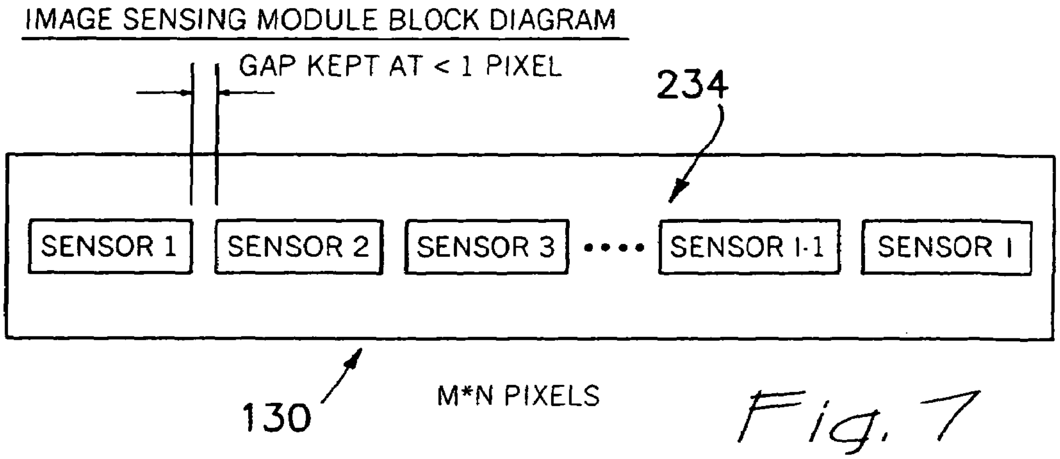
FIG. 7 shows a block sequential diagram of the respective image sensing method.
Figure 8:
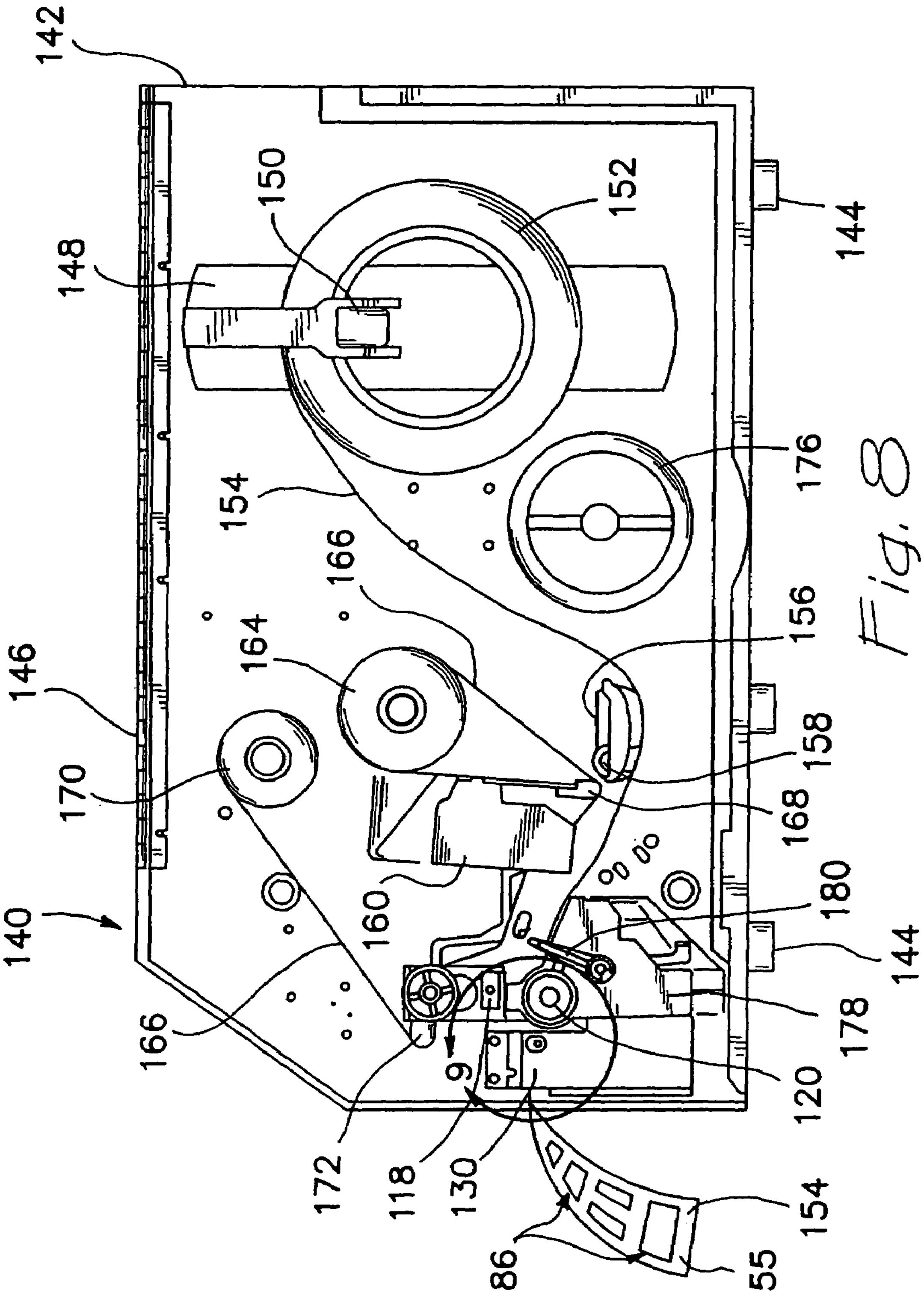
FIG. 8 shows a side elevation view of a thermal printer which incorporates this invention.

Looking more particularly at FIGS. 5, 6, 7, 8, 9, and 10 it can be seen that the mechanical and electrical showings and graphic showings of the thermal printer that can utilize this invention have been shown. Looking specifically at FIG. 8, it can be seen that a thermal printer 140 is specifically shown for the printer 114. The thermal printer 140 comprises a case 142 seated on posts or pads 144. The side elevation of FIG. 8 shows a hinge 146 which allows a cover to be emplaced over the working mechanism of the printer.

Looking more specifically at the interior of the printer, it can be seen that a bracket 148 is shown for supporting a media support rod 150 for a spool of media 152. The spool of media as unwound is seen as the strip 154. It is a combined strip for printing upon with an underlying carrier or liner 155. The media 154 can have a plurality of variously sized labels to be printed upon in various configurations on an underlying paper or other type of liner or carrier 155. Such labels can be receiving documents, stocking labels, bin labels, picking documents, pallet labels, multi-part shipping documents, manifests, bills of lading, and reports.

The media 154 forming the labels is passed under a tensioning foot 156 having a pivotal support 158. The foot 156 can travel upwardly and downwardly to maintain tension on the media 154. The media 154 is passed to a print head support bracket 160.

The print head support bracket 160 has a print head which will be detailed hereinafter in the form of print head 118. The print head 118 is comprised of a number of heated pixels or dots which heat a wax, plastic, or other type of print ribbon. This ribbon, can be seen in the form of a print ribbon roll 164 from which the print ribbon 166 is unwound and maintained in tension by a floating rod, roller, or bar 168. As the print ribbon 166 passes toward the print head 118, it allows for the placement of pixels or dots being printed on the media 154. The media and the print ribbon are supported by a rotating platen 120 that is underlying the print head 118.

After the print ribbon 166 has placed and printed appropriate pixels or other marks on the media 154, it then passes to a windup spool 170. The passage of the used print ribbon 66 is over a head 172 that can be a floating head or a spring loaded head for adjusting the pressure and floating movement of the print ribbon 166 thereover.

In the eventuality a number of pre-printed labels are required, a rewinder 176 is shown for winding the labels back. A bottom support 178 is utilized for supporting the structure including the platen and the drive mechanism. A lever 180 with a securement latch can allow for connection and receipt of the print head bracket 160.

The reading process after printing is accomplished by means of a read after print mechanism or imager 130 that will be detailed hereinafter. The material that is to be read is the printing on labels such as labels 186 of various sizes that form the media 154 with the underlying carrier or liner 155.

Figure 10:
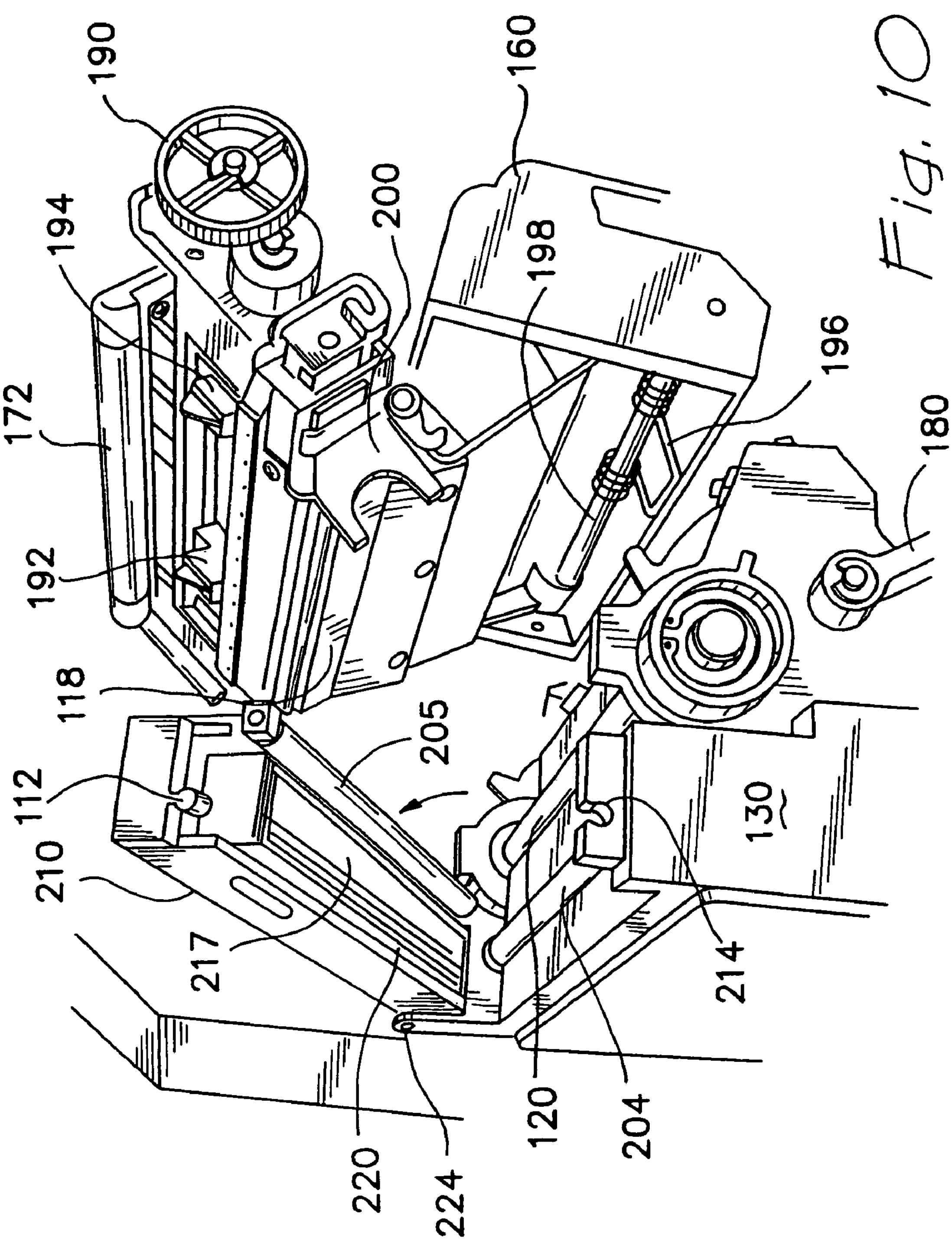
FIG. 10 shows a fragmented perspective view of the thermal printer in an open position as generally seen in the side elevation view of FIG. 9.

Looking more particularly at FIG. 10, it can be seen that the print head 118, platen 120, read after print module 184 or imager 130 and the other elements have been shown in an open position for receipt of the media 154 and print ribbon 166 for placement therein to subsequently feed it through for a printing process.

The media 154 and the print ribbon 166 are passed under the print head 118 and over the platen 120. The platen 120 is driven by the motor 124 connected thereto. The speed of the motor turning the platen is determined by the method and process of this invention.

In order to adjust the pressure of the print head 118 against the platen 120, a wheel 190 is shown. The wheel can be automatically driven or indexed depending upon the input of a stepper motor which drives the wheel. The wheel turns to provide movement to lead screws attached to blocks 192 and 194 that move the pressure point of the print head 118 along and over the platen 120.

In order to spring load the opening of the print head bracket 160, a spring 196 is shown wound around a rod support 198.

In order to seat the print head bracket 160, a seating inset in the form of a bracket 200 is shown which cooperates to sit over the platen 120 without binding its movement. The bracket 200, with its semi-circular concavity also serves to register the print head 118 over the platen 120.

Looking more particularly at the read after print (RAP) controller 128 and imager or image sensing module 130, it can be seen that a roller 204 is shown for passing the print media 154 with its respective labels 186 thereover. The print media 154 with the liner or carrier 155 passes over the roller 204 so that the labels can be placed in a position for reading by a read head 210.

The read head 210 is held in place by a locking tab 212 which displaces the side walls of a concavity 214 to seat therein. A lens array or grouping of lenses which will be detailed hereinafter is placed under a clear cover 217. A further array of light emitting diodes 220 is used to provide a light source. The entire read after print head 210, is hinged to a hinge point 224 for lifting and lowering it onto the base thereof. Appropriate handling of the media 154 with labels 186 can be such where it comes into close proximity for reading through the cover 217 by means of a second roller 205. The second roller 205 effectively works with the other roller 204 in order to place the media 154 with the labels 186 in close proximity for reading.

Figure 9:
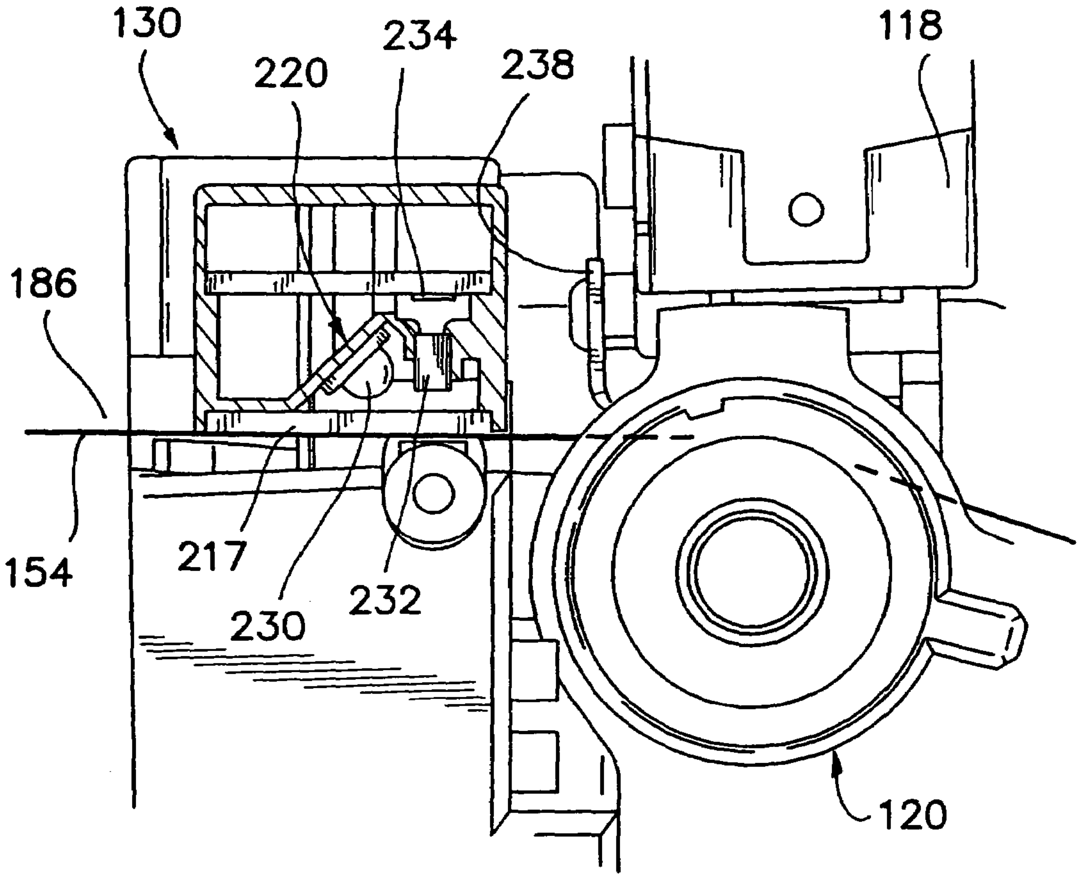
FIG. 9 shows a detailed view of the print head, platen, and reading module as encircled by circle 9 of FIG. 8.

Looking more particularly at FIG. 9 which has been encircled from the showing of FIG. 8 by circle 9, it can be seen that the LED array 220 has been shown with an LED 230. The LED array 220 is spaced at eight LED's 230 to the inch. The LED array 220 is mounted so as to cast a light on the labels 186 as well as the media 154 and carrier 155. This light on the specific labels 186 is reflected and captured by a series of gradient index lenses 232. The gradient index lenses 232 can be derived from a doped piece of glass or provided as an individual array or lenses. The gradient index lens (GRIN lens) in this case provides a one to one relationship. The one to one relationship of the image is then cast on to a sensor array 234 of a plurality of photo or light sensors.

An edge removal member 238 is shown for removing the print ribbon 166 from the media 154 so that it can then be rolled up on the roll 170. However, any other means for handling the print ribbon 166 can be utilized.

Figure 5:
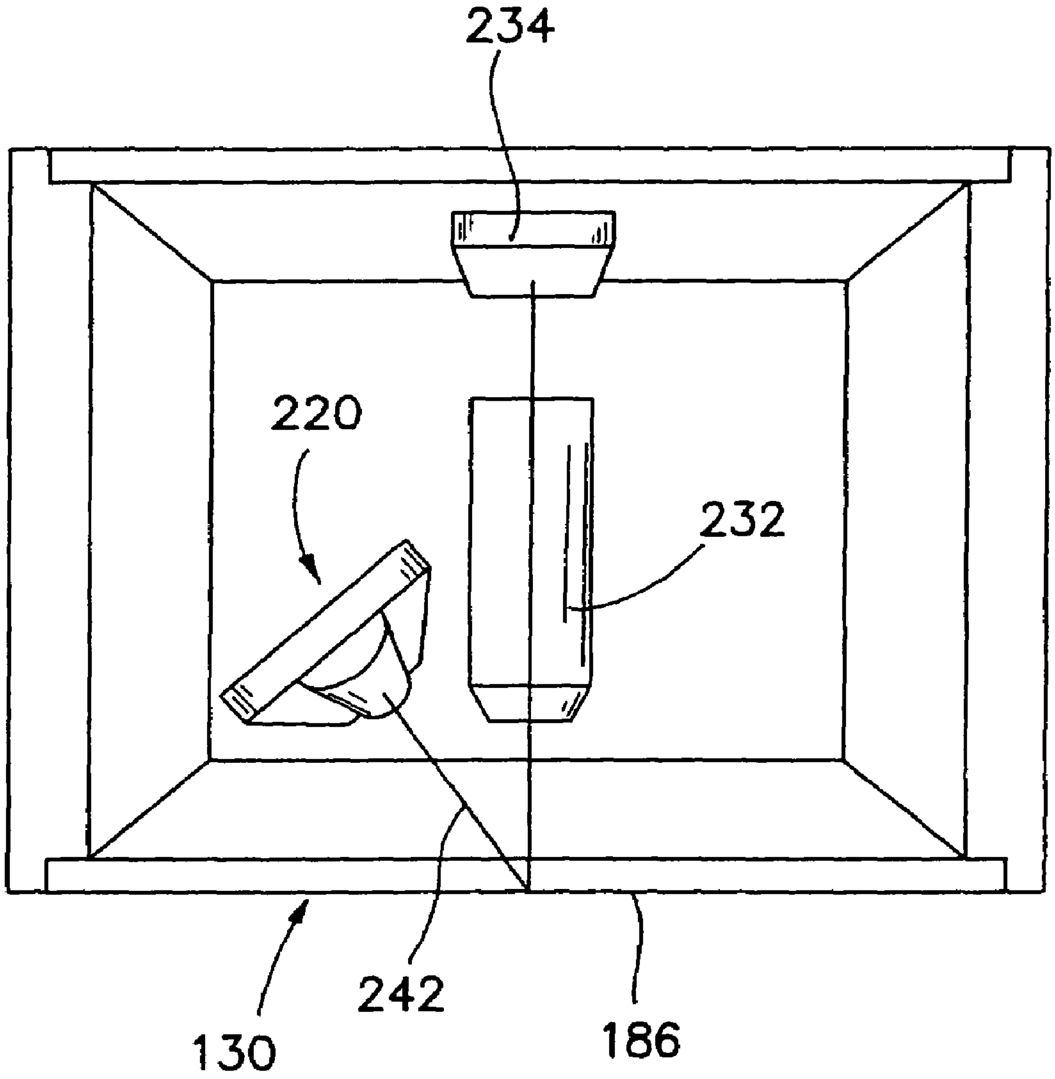
FIG. 5 shows a schematic view of the sensor lens and light source for reading the printed subject matter.

Looking at FIG. 5, it can be seen that the orientation of the LED array 220 is such where it casts a light in the form of a light source or beam 242 onto the label 186 that is to be read as well as the media 154 and carrier 155. The one to one GRIN lens 232 then transmits the beam 242 to the light sensor array 234.

Looking more particularly at FIGS. 5 and 6, it can be seen that the LED's shown as an array 220 are placed in proximity to the GRIN lens 232. This GRIN lens is fundamentally a rod lens having multiply doped areas so that it focuses the output of the reflected light 242 to the photo sensors 234.

When seen in conjunction with FIG. 5 and FIG. 6, the LED's cast a light that is received by the photo sensors 234 that are approximately six hundred (600) to the inch but can be twelve hundred (1200) to the inch or more depending upon the resolution desired. The higher resolution the more the aspects of each particular pixel can be analyzed as to its gray scale nature.

In order to allow for a series of multiplexed outputs seen in FIG. 6, a shift register 251 is utilized as well as a buffer 254. The buffer 254 has a clock pulse (CP) and a synchronization pulse (SP) to provide for the output and provide for the output on a synchronous and clocked basis from the shift register. A ground (GRD) is provided with appropriate outputs from amplifiers 1, 2, 3, and 4 to voltage outputs 1, 2, 3, and 4 to a multiplicity of voltage outputs M. Thus, the photo sensors 234 can be ranked, or grouped from 1 through a given number and spaced for density depending upon the degree of resolution that is required in order to determine the gray scale and quality of the printed subject matter.

The array of LED's 220, GRIN lenses 232, and the photo sensors 234, provide an output of the reflected light that can be reviewed and read as the beam of light 242 is passed to the sensors 234.

Looking at FIG. 7 it can be seen that the image sensing module 130 block diagram incorporates the gaps of the sensors 234 at less than one pixel. In this manner, the sensing module sensors 234 or photo sensors M×N is greater in density than the number of M×N pixels. This provides an overlap in density such that the sensors 234 are gapped so as to be less than one pixel. In this manner, they are able to capture pixels without skipping any dark material within the gray scale.

Figure 11:
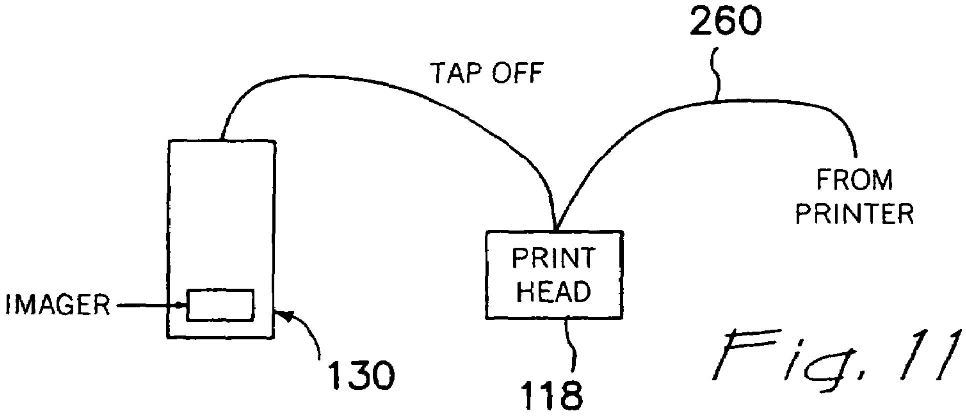
FIG. 11 shows a simplified view of the data stream transfer.
Figure 12:
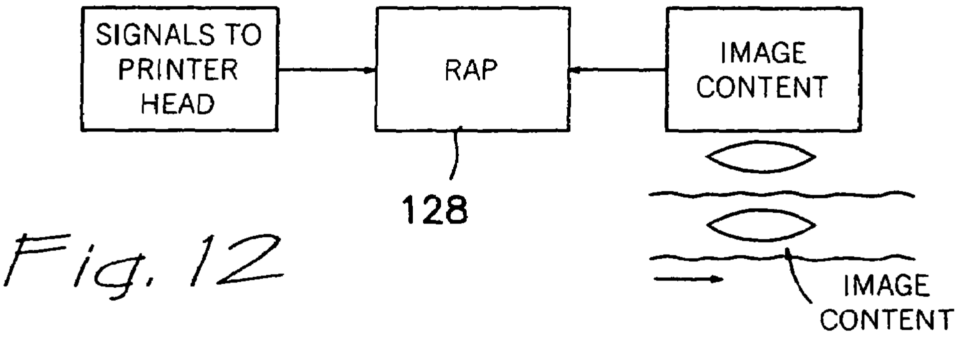
FIG. 12 shows a method and process block diagram of the data stream.
Figure 13:
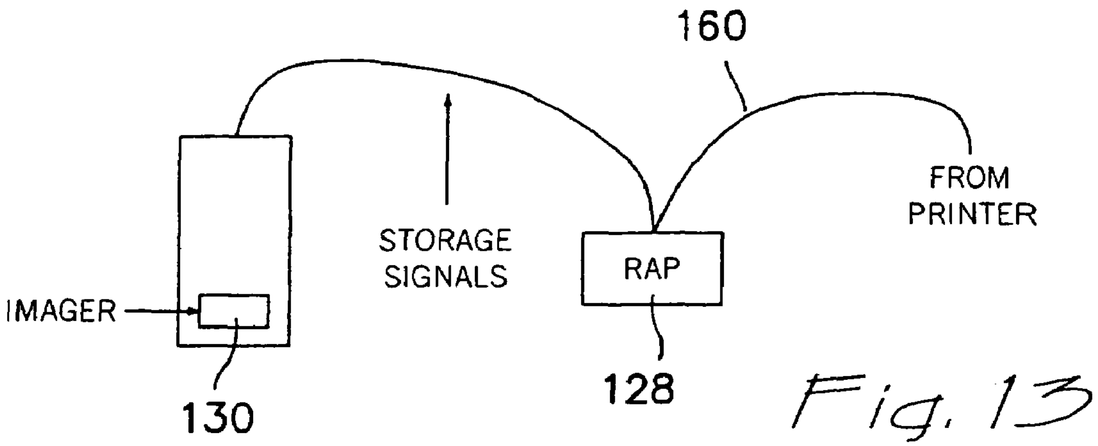
FIG. 13 shows a schematic view of the data stream handling on an enlarged basis.
Figure 14:
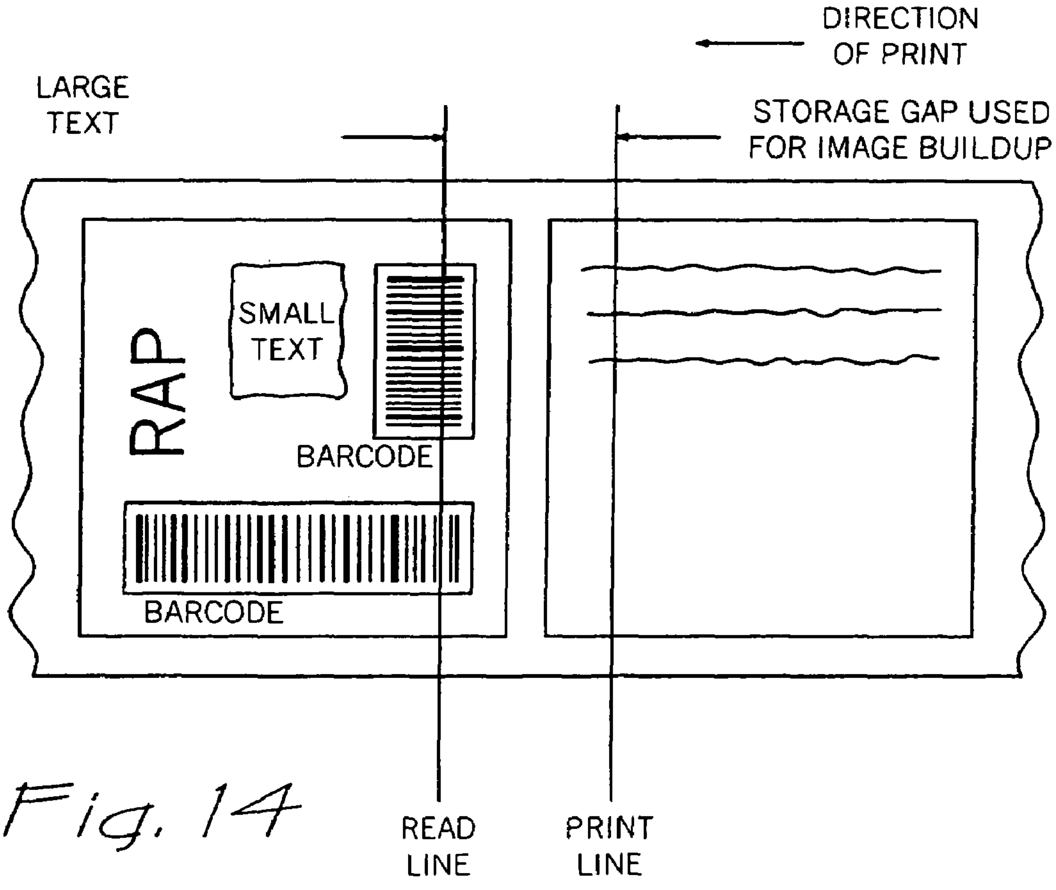
FIG. 14 shows a plan view of multiple text and bar codes being printed and the respective print area and read area pertaining thereto.

FIG. 11 shows the data stream from the printer including the printer controller 110 and the host system 116. This data stream is provided to the print head 118 as a data stream 260. The data stream 260 to the print head 118 is tapped off as seen in FIG. 11 as well as the data from the information received from the read after print imager 130. The data stream 260 and the readings of the imager 130 are then processed in the read after print (RAP) or controller 128 shown in FIG. 12. The image content from the imager 130 is delivered to the RAP controller or RAP 128 and the signals to the printer head in the form of data stream 260 are presented to the RAP 128 for comparison sake. The same scheme is seen in FIG. 13.

Figure 3A:
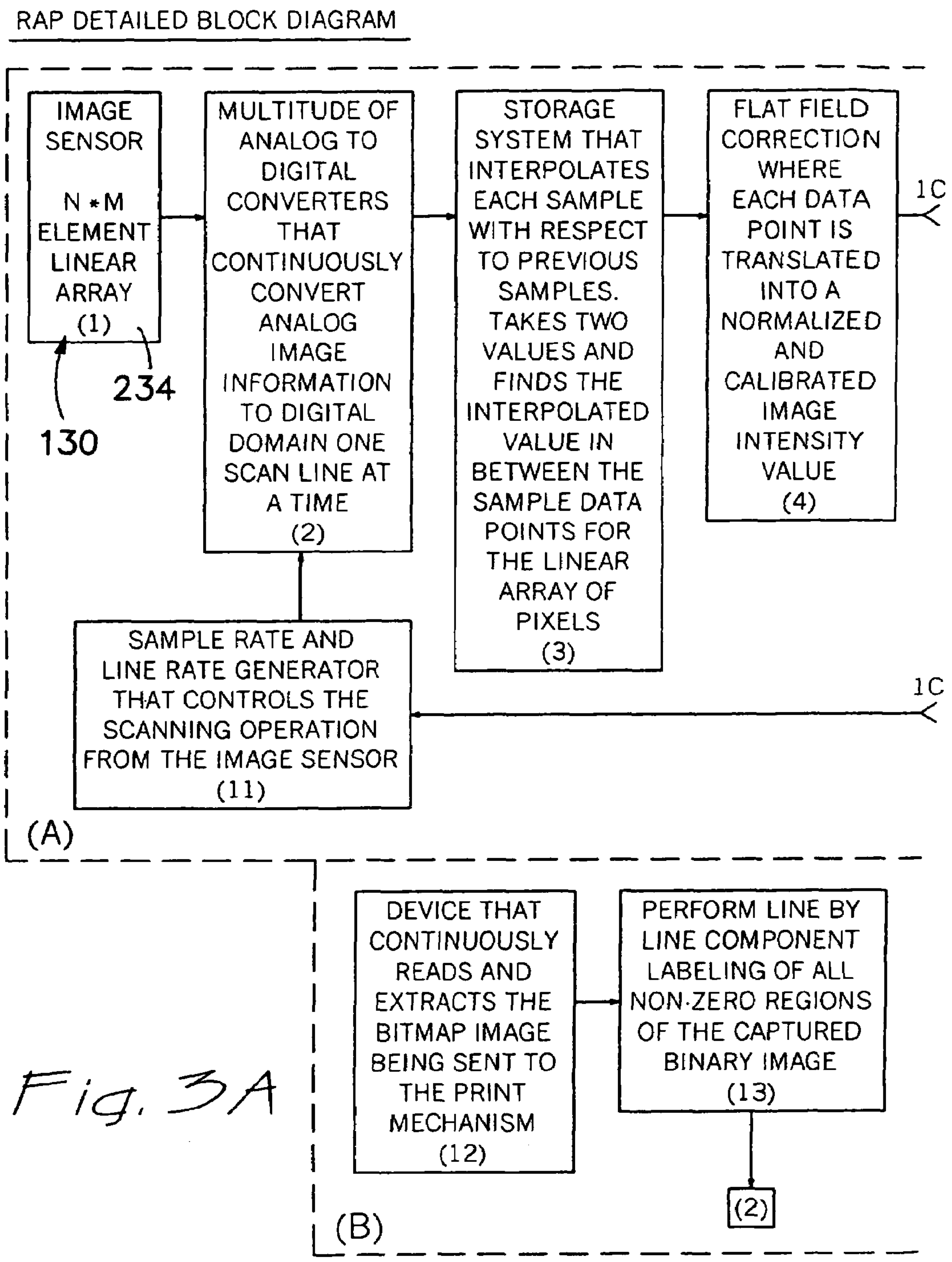
FIGS. 3A and 3B are figures that are interconnected at interconnects (IC) and show the detailed block diagrams of the various methods and functions for reading and characterizing the printed subject matter as being of an acceptable standard.
Figure 3A:
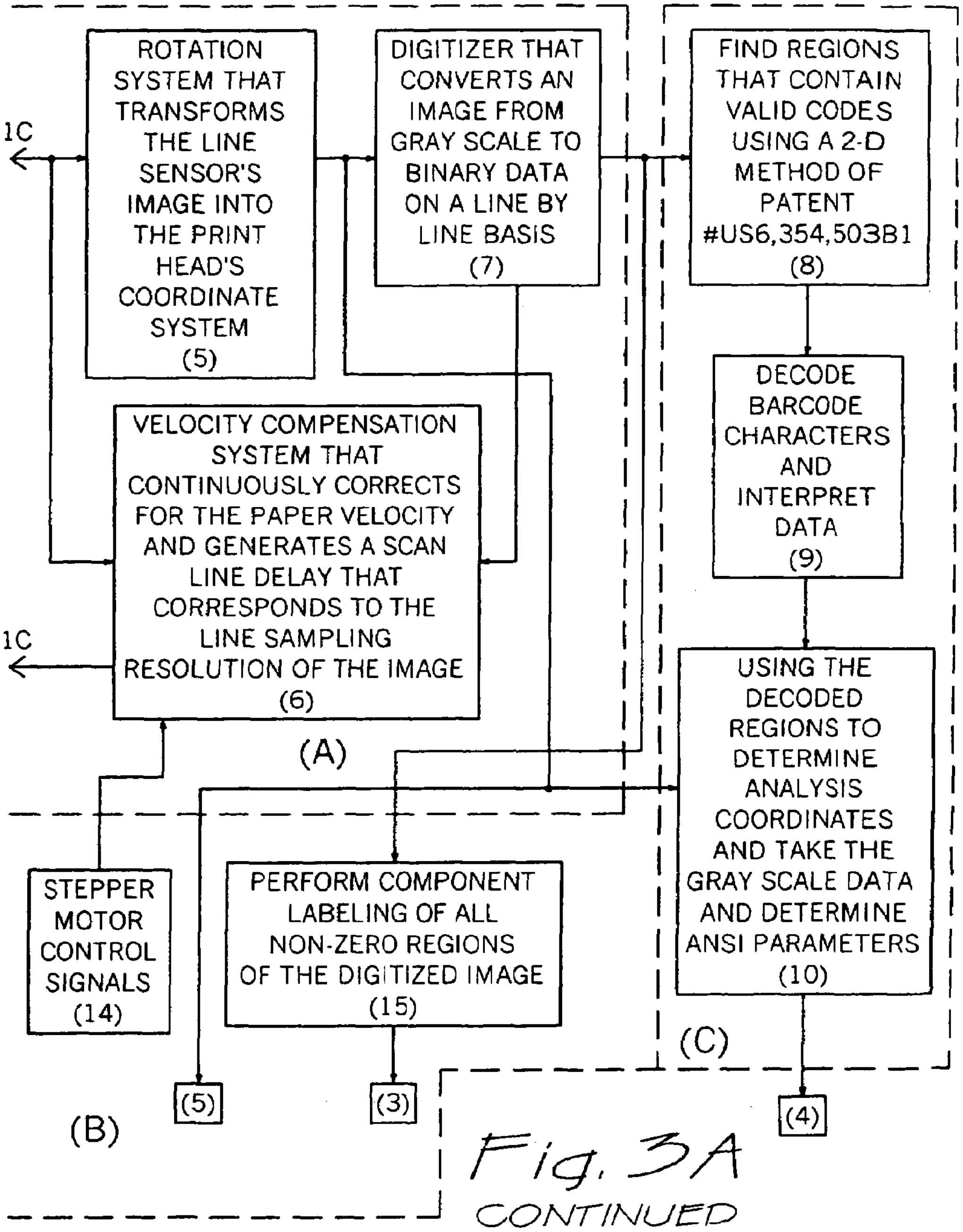
Figure 3B:
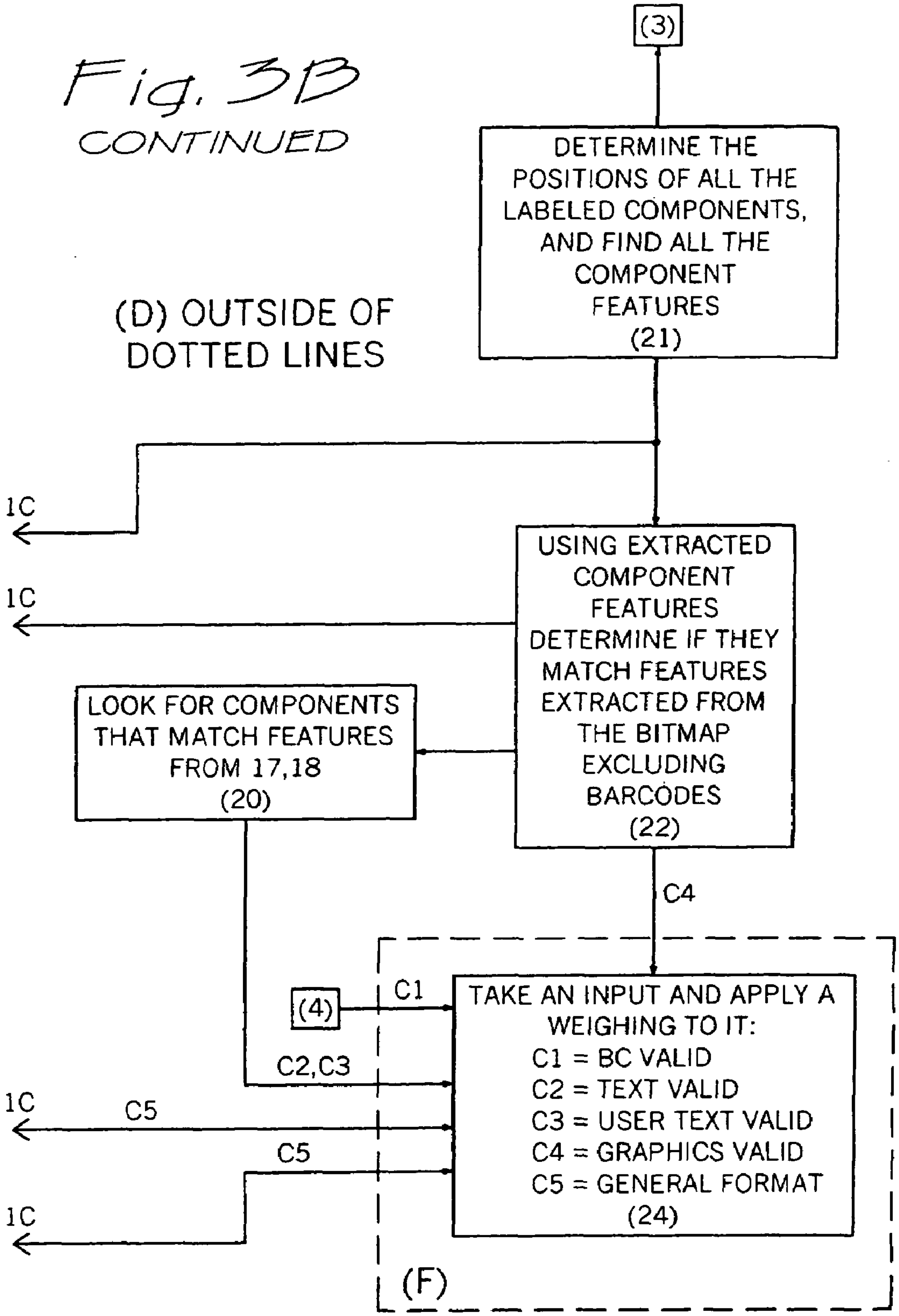

Looking more carefully at FIGS. 3A and 3B, it can be seen that they set forth the detailed block diagram of the read after print (RAP) 128 method and process of this invention. FIG. 3A has been split between two sheets and is interconnected by the respective interconnects IC.

FIG. 3B has also been split into two sheets and is interconnected by the interconnects IC shown therewith.

The processes and method steps in use with the hardware, software, and firmware are set forth in parenthetical steps shown in blocks numbered (1) through (26). The major steps and processes have been set forth in dotted blocks labeled (A) through (F). These have been shown in the logic functions such as that of FIG. 1.

Referring to FIG. 3A, the dotted and blocked out portion (A) shows the image sensor or module in the form of the image sensor 130 receiving the images through the sensors

234 of the number of M×N sensors. This is derived from the array of elements of the sensors 234 (1).

The output of the multiplicity of sensed data is then processed with analog to digital A to D convertors that continuously convert the analog image information from the sensors 234 to a digital domain one scan line at a time (2). The one scan line at a time is with respect to each line of pixels that has been printed.

A processor or processors with appropriate storage, or memory interpolate each sample with respect to previous samples. It takes the two values and finds the interpolated value in between the sample data points for determining the linear array of pixels that are being printed (3). This process under FIG. 3A (A) uses a processor or analogous hardware and/or firmware such as or analogous to a Field Programmable Gate Array (FPGA) processes. The FPGA is connected for receipt of the data from the photo sensors 234.

Flat field correction is then incorporated in order to smooth out the discrepancies in the field in order to provide for a smooth line. In other words, various intensity values of high and low are combined to provide a line of flat field correction (4).

Inasmuch as the print head 118 might not be in alignment with the image sensing module or images 130, a rotation system or method (5) transforms the image into the print head's coordinate system through a rotation system so that it is in proper alignment. In this manner, it takes the image as sensed and rotates it into a proper bit map orientation for the read head or imager 130. The information is then digitized by a digitizer that converts an image from gray scale to binary data on a line by line basis (7).

A velocity compensation system in the processor which in this case would be the FPGA continuously corrects for the liner, carrier 155, or label or media 154 velocity and generates a scan line delay that corresponds to the line sampling resolution of the image. In this manner, the particular velocity of the media 154 and carrier 155 is accounted. This generates a scan line that corresponds to the proper line of sampling and resolution of the image. This is the velocity compensation system (6).

The foregoing functions correspond to the acquisition and alignment of the image function (A) as shown in FIG. 2.

Looking at dotted line block (B) it can be seen that the print head information is derived from a data stream 260 that allows a continuous reading and extracting of the bit map image being sent to the print head 118, (12). Thereafter, a line by line component labeling of the non-zero regions of the captured binary image are provided for (13). The center of mass of the particular image is calculated as to both qualities of area and gray scale content.

In order to provide for the velocity compensation (6), the stepper motor 124 control signals (14) are input to the velocity compensation system and processor. Additionally, it can be seen in block (15) a component labeling function is performed of all non-zero regions of the digitized image in order to control the respective characterization of the images (15).

Looking at dotted line block (C) on drawing 3A continued, it can be seen that the process of finding the bar codes and marking the symbols are shown. This begins with a termination of the regions that contain valid codes using a two dimensional method of U.S. Pat. No. 6,354,503 B1 which is included here by reference. The process, as fundamentally described in that patent extracts the features of the bar code on a minimum and maximum basis by subtracting one from the other until a certain value is received. This then creates the triggering of a reading function. In effect, the reading of the particular region will not take place unless there is a given amount of material printed on a bar code to establish the effective width in order to proceed with a reading to avoid spurious or improper decodes. As shown in (9) of block (C), the bar code characters are then decoded and the data is interpreted in a manner to review the content as to the specifics thereof.

The decoded regions provided in dotted line block (C) uses the decoded regions to determine and analyze the coordinates. It takes the gray scale data to determine various parameters (10) including those established for American National Standards Institute (ANSI). Thus, a check of the decoded text in (C) is undertaken for processing and determining the quality of the printed subject matter against a given set of values and a look-up table. The functions within the dotted lines of block (C) can be processed by a processor such as a common Digital Signal Processor DSP which is known in the art. This DSP can be a single DSP or provided among a series of DSP's.

In order to determine the positions of all the labeled components and find all the component features, a determination is made as shown in FIG. 3B (16). This is determined by way of the photo sensors 234 and the output through the respective amplifiers as previously stated as to FIG. 6. It should be noted that the information from the determination (16) is transmitted for two functional processing methods. One defines and determines the characters through optical character recognition (OCR) (17). As to the other, the information from the determination of the positions (16) is transmitted for using the extracted component features to determine if they match predetermined features such as a bar code (18).

The foregoing processes methods of functions (17) and (18) are transmitted to block (20) that can be seen in FIG. 3B.

A further function when a determination is made of the positions of all the label components and the component features is established and transmitted to determine the subrotation and velocity using the edges of small objects from the digitized image compared to the same edges on the bit map image. In other words, a comparison is made as to the rotation if it is off of the particular bar code or other printed material as seen in the process of (19).

The determination of the angular offset is such wherein a compensation can then be made as to providing for accuracy of reading in the event that a particular portion is rotated in an offset manner that would not provide for the true reading of it. Also, as can be appreciated in the process of (19), the velocity using the edges of small objects in the digitized image allows for control of the movement of the stepper motor 124 and the platen 120 to which it is connected.

Once the component features have been extracted, a determination can be made if they match features extracted from the bit map excluding the bar codes as seen in process (22). The features to match up with the bit map are such wherein they can then make a comparison for purposes of determining accuracy of the printed subject matter with that which was to be printed by reviewing the tapped off information from the data sent to the print head 118 in comparison to the image actually seen. This function as can be seen in process (23) is a major function under dotted line process (E) for the weighing of criticality as to the degree of correctness of the printed subject matter through the finding and matching of the groupings as seen in FIG. 2.

Again, looking more specifically at FIG. 3B it can be seen that the input from (5) which relates to the rotation system that transforms the line sensor's image into the print head's coordinate system helps with respect to the detection of the edges of the form or the subject matter to be printed on the labels 186. It should be understood that if the edges of the form on the label 186 are not accurate with regard to the media as opposed to the underlying liner or carrier 155 and it is off the edge, or in the alternative that the edge of the form is not centered correctly on the media, that improper printing will take place. This has to be verified through the process of detecting the edges of the form (25). After the edges of the form are detected (25), a determination of the position of the printed groupings relative to the edges (26) is undertaken. This determination of the groupings relative to the edges is enhanced by the input of also using the predetermined collections of features and groupings (23).

The input with regard to the extracted component features to determine if they match features extracted from the bit map excluding the bar codes (22) is provided as an input in the process for weighing the respective elements and data of the printed subject matter (24). This is the function by the processor in the form of the Digital Signal Processor as established with respect to a look up table. This is also illustrated in FIG. 2 as to the weighing and criticality, and the taking of action with respect to the determination (F). Inasmuch as the bar code input C4 has already been evaluated and input, the extracted features process (20) does not necessarily input the bar code. They have already been analyzed and can be either input or not depending upon the process.

The process features of C1, C2, C3, C4, and C5 that respectively relate to bar code validity, text validity, user text validity, graphics validity, and the general format are weighed for their criticality in the process (F) as shown. After the criticality is determined based upon the absolute values of C and the respective weighings (i.e. a), action is taken depending upon the quality of the printed subject matter. In other words, if the media 54, discrete label 86, or other material upon which the printing takes place, is such where the bar code can't be read, the process is stopped. If the bar code is below a preset threshold, the process can also be stopped. Also, if the code is consistently bad, the process can be stopped.

Figure 4:
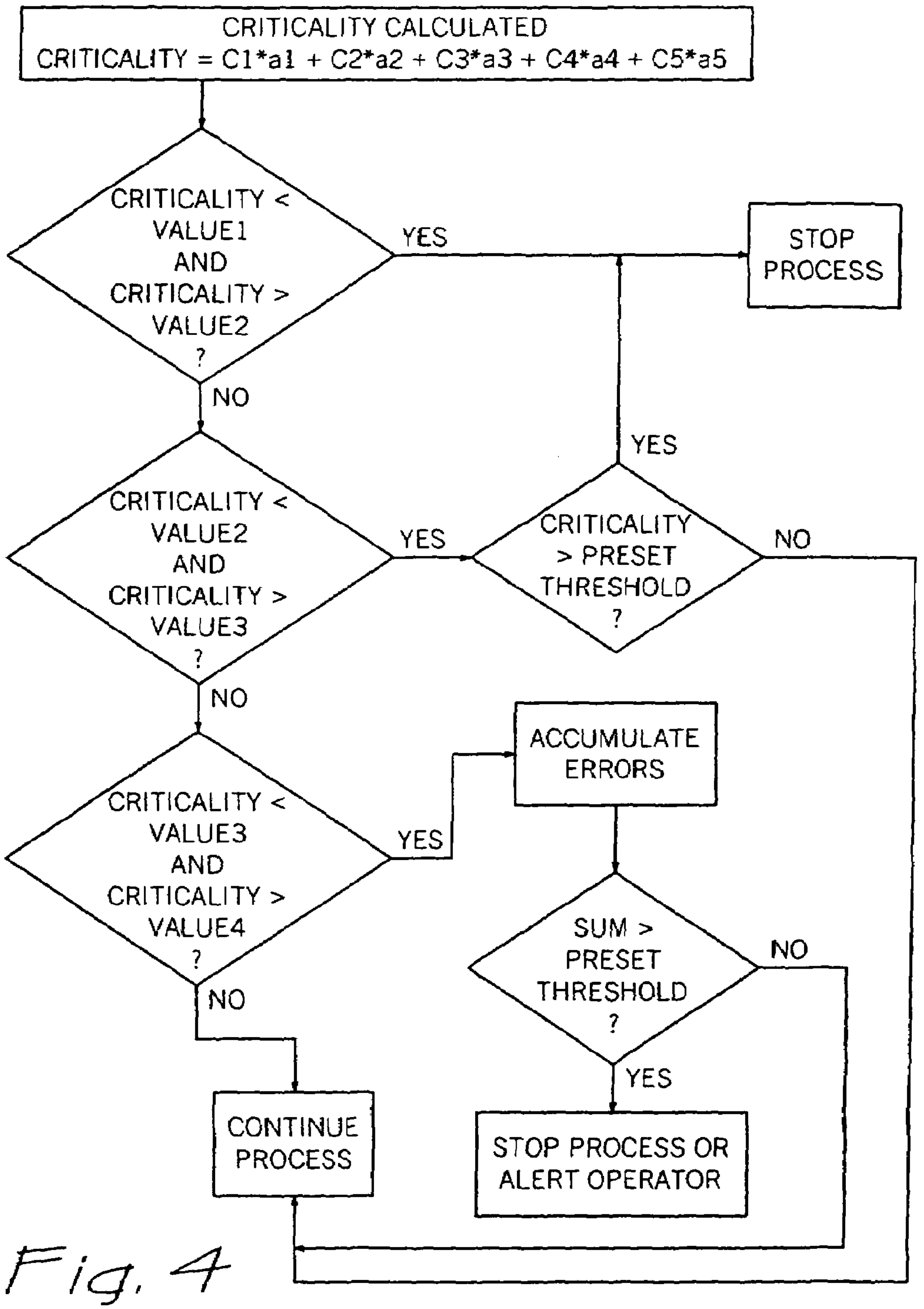
FIG. 4 shows a logic diagram with regard to the criticality that is to be calculated of the respective values of the data read compared to the data which was to be printed.

Looking more specifically at FIG. 4 a logic table for maintaining or stopping the process is shown. It should be understood that the process can be verification of a properly printed format, utilization of the properly printed format, or emplacement of the printed material on another underlying material or in a subsequent process such as an inline manufacturing process or labeling of various boxes and components from a series of multiply printed labels.

When looking at FIG. 4, it can be seen that the criticality is calculated in the manner previously established.

The first analysis in the process is if the criticality is less than a first given value and the criticality is greater than a second given value the process is then stopped. If not, the printing process goes on to determine whether or not a preestablished number as to criticality is less than the second value and whether or not the criticality is greater than a third value. If yes, the criticality will be tested as to whether it is greater than a preset threshold, if not, the process will be stopped. The next analysis in the process is whether the criticality is less than a third value and greater than a fourth value, if not, the process will continue.

As seen from the process blocked out in FIG. 4, the continuation of the process automatically or the alerting of the operator takes place when the sum exceeds a preset threshold. These preset thresholds can be established within the look-up table or any other process in both the feedback to the printer controller 110 or the host system 116. The host system 116 can handle a plurality of printers in which labels are being extracted from various printing processes to be placed on various packages, goods, manufactured items to be assembled, and any other particular grouping of goods or equipment which is to be labeled and later read or labeled and maintained in a subsequently labeled relationship.

Figure 15:
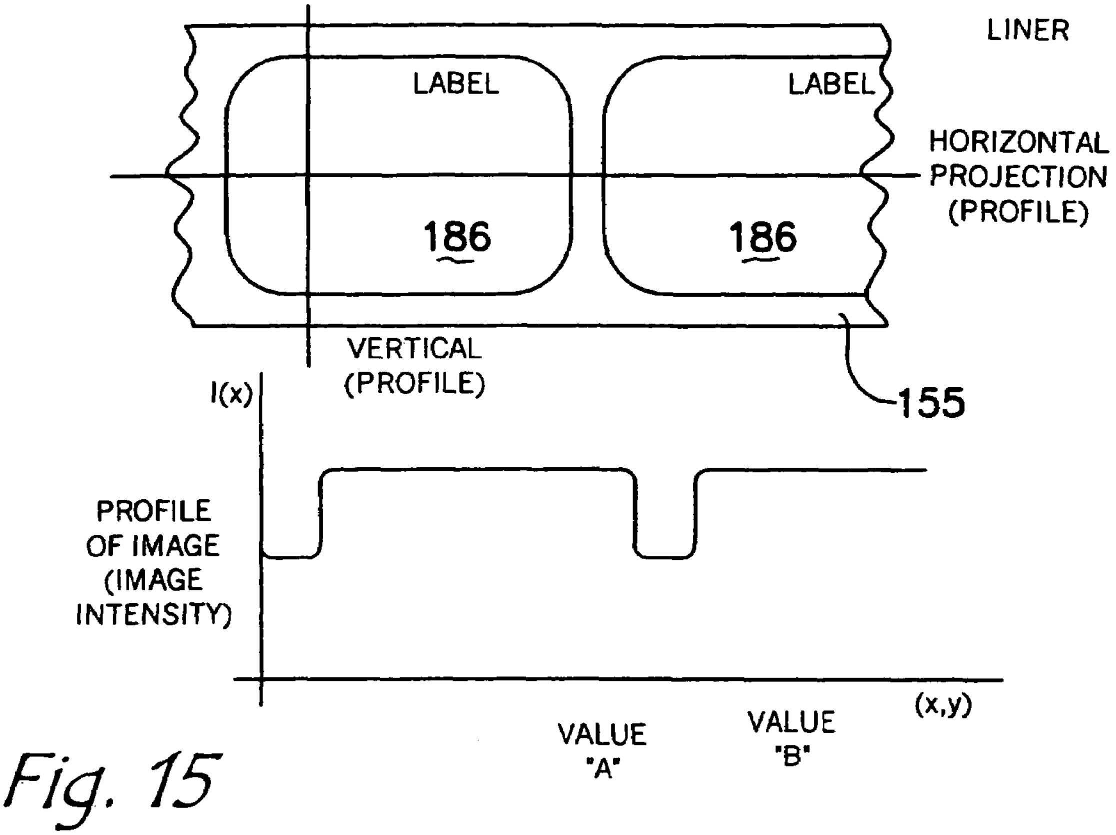
FIG. 15 shows the ability to determine proper placement of the print on the label.

Looking at FIG. 15 it can be seen wherein a label 186 is emplaced on the liner or the carrier 155, which underlies a portion of the media 154 forming the labels to be printed upon.

FIG. 15 shows a detection of the edges of the labels 186 through a horizontal profiling. The determination of the edge of the label 186 is important with respect to assuring the printed subject matter does not overlap the label. It is also important in some cases for centering the subject matter to determine whether it is within the border or margin, in a properly positioned relationship. This is done by determining the intensity value. In particular, the intensity value of the label 186 is differentiated from the carrier 155 as determined by gray scale imaging.

The gray scale imaging and intensity value of the upper level and lower gray scale value of the lower level is determined to effect an edge reading. Due to the fact that the label 186 moves along at a particular rate, the calculation is performed so that if the area is bigger, an error indication is established. Fundamentally, the edge region is established through the gray scale differentiation as shown with the high and low aspects so that a value A has an upper value and a value B has a lower value. This particular intensity value establishes the edge region of the label so that a calculation of the edges for proper print and placement of the print with respect to the edges of the label can be effected.

Figure 16:
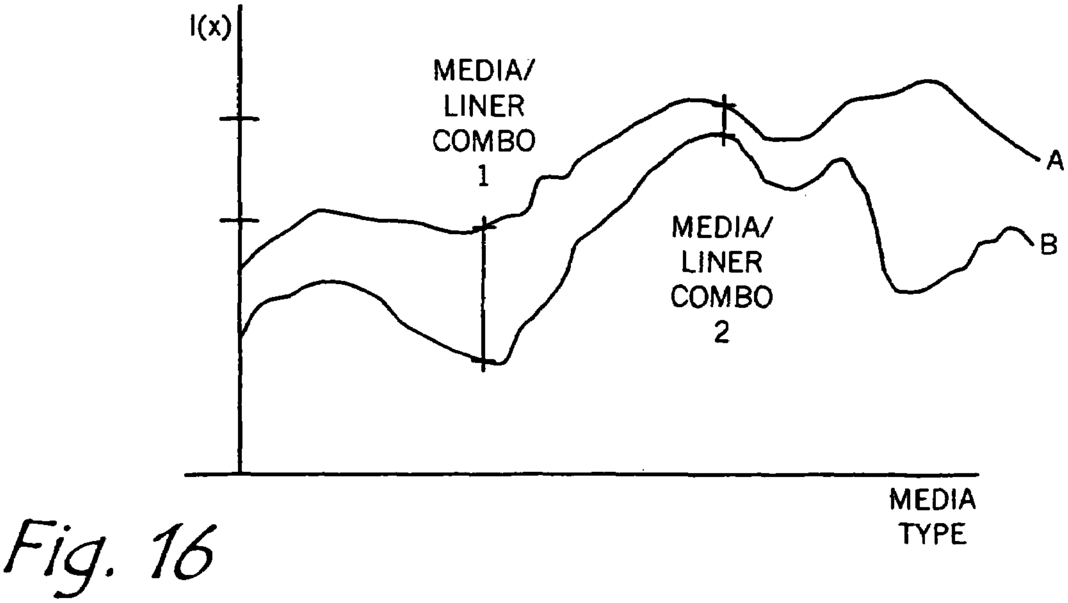
FIG. 16 shows the placement of the label within the realm of a given set of parameters.

Looking at FIG. 16, it can be seen where the media and liner combination for detecting the edges has been shown with the higher value A and the lower value B as to the respective gray scale. The printed subject matter is calculated with respect to the spread of the gray scale so that the edges are consistent with regard to the placement of the printed subject matter on the label 186.

Figure 17:
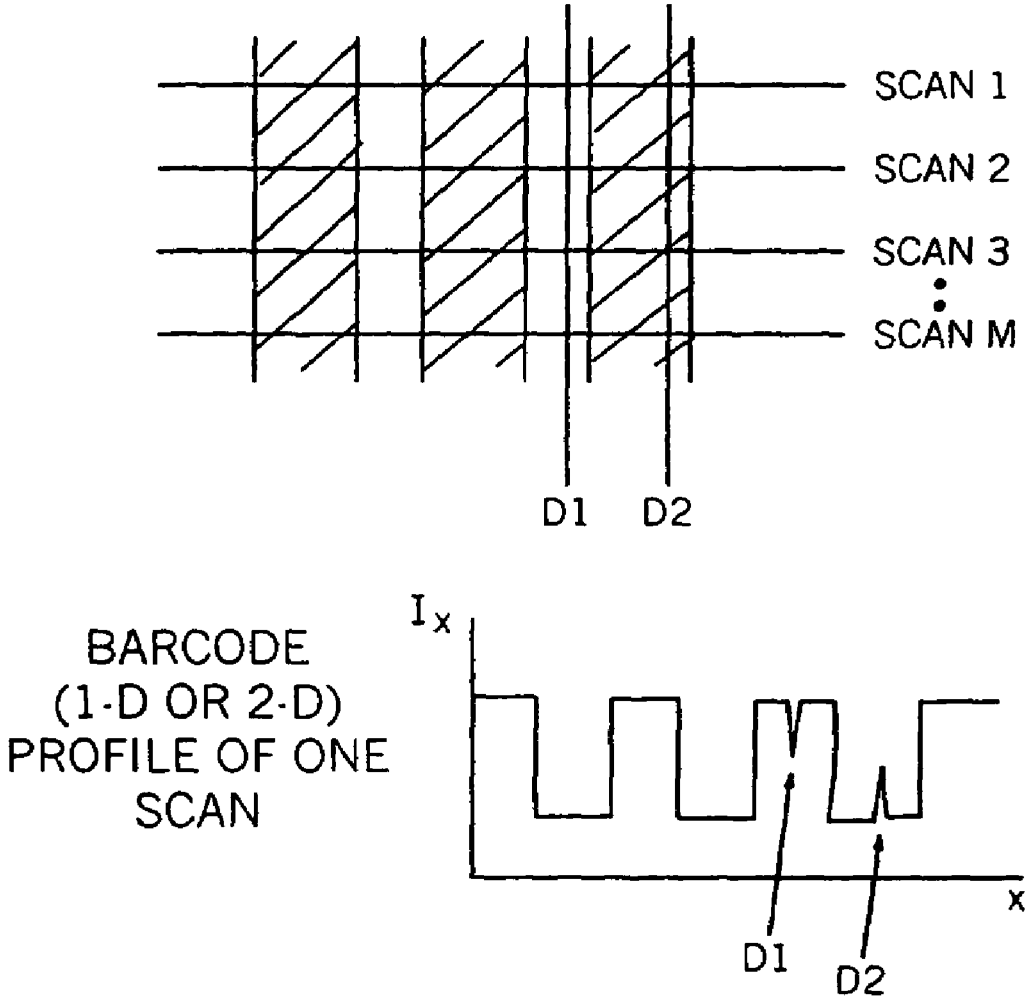
FIG. 17 shows a profile of the scan which is taking place and the handling of the data.

FIG. 17 shows the defect analysis of a single scan line. In looking at the defect analysis, it can be seen that D1 and D2 indicate a light area and a dark area respectively. These respective light and dark areas are analyzed to provide for a bar code profile of one scan. The scan line is at twice the printing resolution, in order to allow for overlap and inclusion of the spread of the particular printed subject matter. Thus, the light area defect D1 and the dark area defect D2 are determined on a single scan at two times the printing resolution to check the overlap. The particular defect is established as to criteria based upon end uses such as whether the bar code or printed subject matter is to be read in a retail process or a refined inline manufacturing process wherein various criticalities and weighings must be established.

Figure 18:
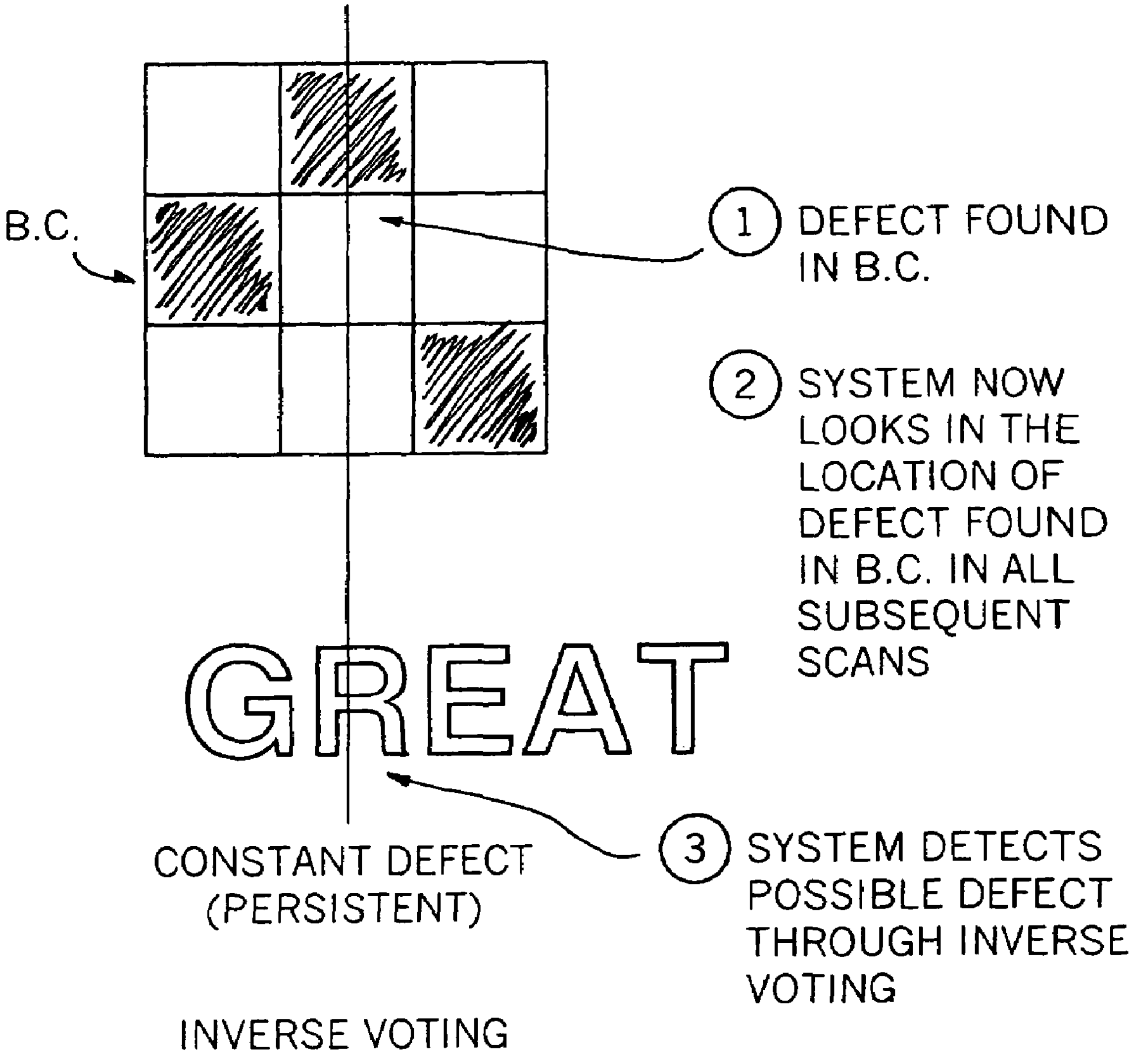
FIG. 18 shows the system and process of calculating a respective blemish on printed subject matter.
Figure 19:
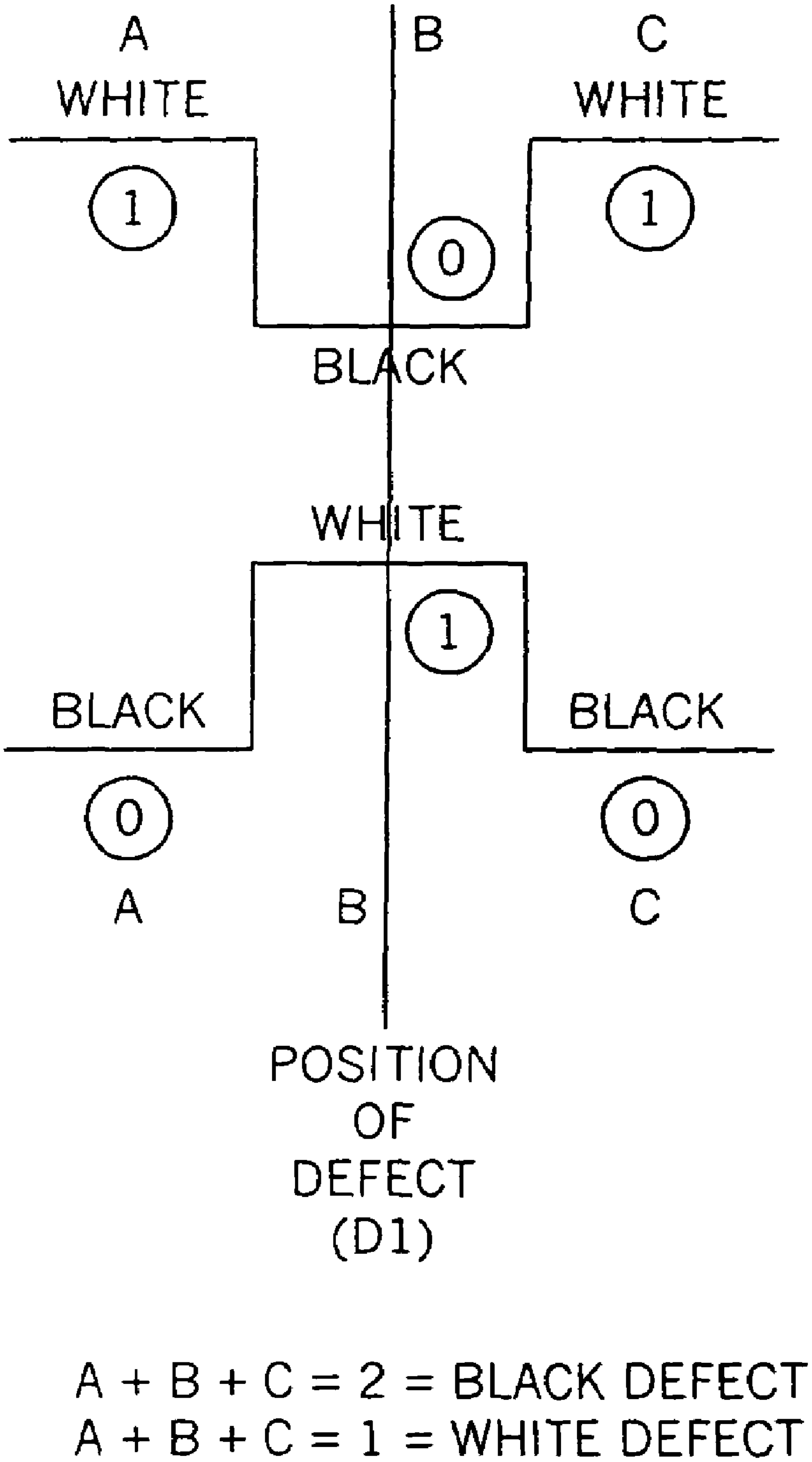
FIG. 19 shows the system and process for calculating the defects through the white and black characteristics of the printed subject matter.

Looking at FIGS. 18 and 19, it can be seen wherein a constant defect is persistent in a bar code. The defect can also be with regard to a particular graphic element. In this case, the defect is seen in a bar code. The bar code is used to find defect positions and then using the principle of inverse voting at these locations. The system and the process then looks-as to the location of the defect found in the bar code and all subsequent scans. If the constant defect is persistent, the system detects the defect through inverse voting logic as shown in FIG. 19. In this case, it can be seen that the black defect being A+B+C=2 and the white defect A+B+C=1 has been established.

Figure 20:
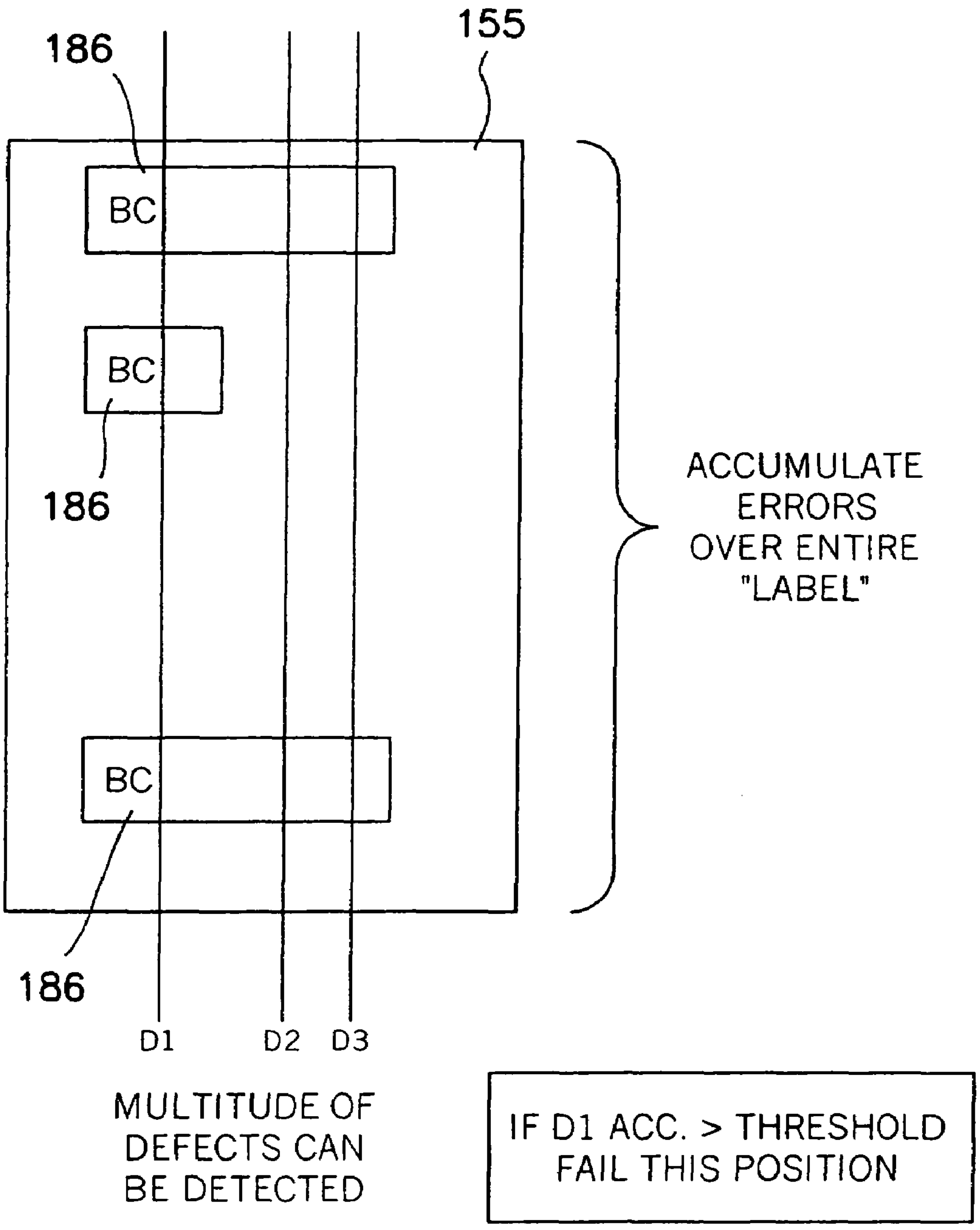
FIG. 20 shows the method and process of accumulating errors over an entire label which has multiple printed subject matter.

In FIG. 20 it can be seen where the errors are accumulated over a series of entire multiple labels and the multitude of defects detected. The defects can be in a scan line such as defects D1, D2, and D3. The defects along an entire series of labels 186 on the underlying carrier or liner 155 are recurrent. The errors are accumulated over the entire label and a determination is made as to whether or not a pixel or printing dot is defective. Such defects can be within a print head of a thermal printer where the element is burnt or stuck.

In the foregoing case, if all three labels as shown in FIG. 20 are defective it would fail the third category as shown in the criticality test of FIG. 2. Thus, criticality 3 in the weighing and criticality action (F) is shown as being established so that there is a consistently bad label 186 and the process is stopped. The threshold can be established as previously stated under any criteria. However, as can be appreciated with a burnt or stuck pixel or thermal printing dot defect the consistency would then be manifest and the entire process should then be stopped.

Figure 21:
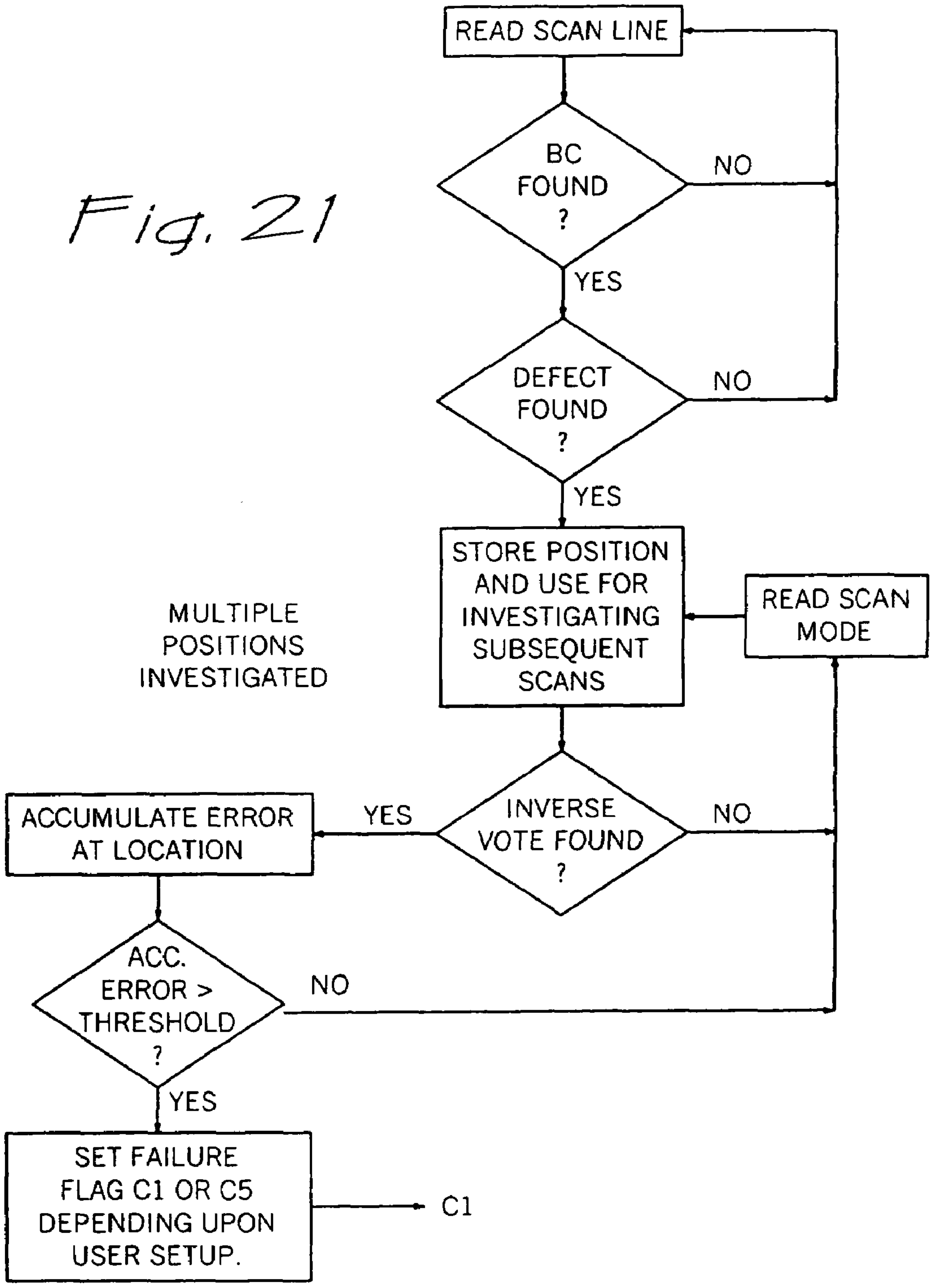
FIG. 21 shows the logic process and method for handling the bar code once read.

FIG. 21 shows the reading of a scan line. If a bar code is found, it then goes on to check whether a defect has been found. This defect is with respect to C1 of FIG. 2 as to the validity of a bar code. The defect can be established within the American National Standards Institute (ANSI) qualification or other bar code standard that can be established based on end use. If the defect is an ANSI or other defect grade, the position and offset is used for investigating subsequent scans. The inverse voting method of the previous process is established and an accumulation of the error at the location thereafter. If the accumulated error is greater than the threshold value, i.e. C1, a failure flag C1 or C5 depending upon the user setup is established. If not, the read scan mode continues with regard to ANSI or other standards.

Again, it should be kept in mind that any processor or series of processors can be utilized. In this embodiment the Field Programmable Gate Array (FPGA) has been used for processing the methods and processes labeled (A) and (B). The Digital Signal Processor DSP is used for the methods and processes labeled (C)-(D) (E) and (F). However, any other combination or processors, storage, or other signal buffers, can be implemented.

From the foregoing, it can be readily apparent that the multiple reading capabilities and establishment of bar code and printed material criteria is enhanced by this invention both as to criticality, weighing, and overall effectiveness in any printing process using various processes which can encompass not only thermal printers, but impact printers and laser printers.

The invention claimed is:

1. A thermal printer comprising:

a print head;

a platen;

a transport system for transporting media upon which labels are printed in conjunction with a print ribbon;

a printer controller for imparting print data to said print head for printing said labels;

an imager for imaging a printed label to create an image of the printed label; and, a read after print (RAP) controller for comparing the image from said imager to an image from data imparted to said print head and for performing label analysis and weighing blemishes against an American National Standards Institute (ANSI) qualification; and a processor in said RAP to take an action based on weighing a blemish in relationship to criticality as to a pre-established criteria of quality, wherein the criticality is a sum of functions dependent on a criticality value based on the ANSI qualification and a weighting based on an application of the image.

2. The thermal printer as claimed in claim 1 further comprising:

a tap for tapping data imparted to said print head connected to said RAP.

3. The thermal printer as claimed in claim 1 wherein said processor determines the speed of said media.

4. The thermal printer as claimed in claim 1 wherein said processor aligns the image determined by said imager with respect to said print head.

5. The thermal printer as claimed in claim 1 wherein said processor finds all bar codes and marks symbols acquired by said imager.

6. The thermal printer as claimed in claim 1 further comprising:

an imager having a light source for casting light on a printed label; and, a plurality of photo sensors for sensing light from said label.

7. The thermal printer as claimed in claim 6 wherein:

said imager has a multiplexer connected to the output of said photo sensors for applying the outputs to a lesser number of amplifiers than the number of said photo sensors.

8. The thermal printer of claim 1, wherein the function is the criticality value raised to a power of the weighting.

9. The thermal printer of claim 1, wherein the weighting is selected by a user.

10. The thermal printer of claim 1, wherein the weighting is based on a look-up table.

11. The thermal printer of claim 1, wherein the action comprises one of a plurality of different actions.

* * * * *